(12) United States Patent
Cho et al.

(10) Patent No.: US 8,254,715 B2
(45) Date of Patent: Aug. 28, 2012

(54) METHOD AND APPARATUS OF DETECTING IMAGE OBJECTS

(75) Inventors: Jae Il Cho, Daejeon (KR); Seung Min Choi, Daejeon (KR); Jiho Chang, Daejeon (KR); Dae Hwan Hwang, Daejeon (KR); Dongil Han, Daejeon (KR); Hyeonjong Jo, Daejeon (KR); Jongho Choi, Daejeon (KR); Jaekwang Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 221 days.

(21) Appl. No.: 12/837,030

(22) Filed: Jul. 15, 2010

(65) Prior Publication Data

US 2011/0007983 A1   Jan. 13, 2011

(30) Foreign Application Priority Data

Dec. 7, 2009   (KR) .................. 10-2009-0120391

(51) Int. Cl.
*G06K 9/40* (2006.01)
*G06K 9/36* (2006.01)

(52) U.S. Cl. ...................................... 382/260; 382/275

(58) Field of Classification Search .......... 382/128–132, 382/164, 172, 173, 254, 260–264, 274–275, 382/278; 600/310, 316, 581; 348/606, E5.062; 375/240.27, E7.193, E7.135
See application file for complete search history.

(56) References Cited

U.S. PATENT DOCUMENTS

| | | | | |
|---|---|---|---|---|
| 5,666,434 A | * | 9/1997 | Nishikawa et al. ........... | 382/128 |
| 5,787,209 A | * | 7/1998 | Konstantinides et al. .... | 382/260 |
| 6,175,596 B1 | * | 1/2001 | Kobayashi et al. ....... | 375/240.27 |
| 6,763,142 B2 | * | 7/2004 | Dai et al. ....................... | 382/260 |
| 6,868,190 B1 | * | 3/2005 | Morton .......................... | 382/278 |
| 6,937,772 B2 | * | 8/2005 | Gindele ......................... | 382/240 |
| 7,031,548 B2 | * | 4/2006 | Baggs ........................... | 382/261 |
| 7,127,121 B1 | * | 10/2006 | Pan ................................ | 382/260 |
| 7,734,115 B2 | * | 6/2010 | Kang et al. .................... | 382/275 |
| 2009/0226047 A1 | | 9/2009 | Yu et al. | |
| 2011/0007983 A1 | * | 1/2011 | Cho et al. ...................... | 382/260 |
| 2011/0009720 A1 | * | 1/2011 | Kunjan et al. ................. | 600/316 |

FOREIGN PATENT DOCUMENTS

| | | |
|---|---|---|
| KR | 10-2004-0008791 | 1/2001 |
| KR | 10-2004-0042500 | 5/2004 |
| KR | 10-2008-0073598 | 8/2008 |

OTHER PUBLICATIONS

Bongjin Jun et al., "Robust Real-Time Face Detection Using Face Certainty Map," ICB 2007, LNCS 4642, © Springer-Verlag Berlin Heidelberg 2007, pp. 29-38.

* cited by examiner

*Primary Examiner* — Amir Alavi
(74) *Attorney, Agent, or Firm* — Staas & Halsey LLP

(57) ABSTRACT

An image object detection apparatus includes a noise filtering block for removing image noise an input image, an image scaling block for scaling the noise-removed input image to produce a scaled input image, an image conversion block for dividing the scaled input image into multiple regions and converting the divided image by a modified census transform (MCT) method, a data processing block for comparing MCT values of the image converted by the MCT method with a preset threshold, detecting at least one candidate region and identifying a human region from said at least one detected candidate region, and an image output block for marking the identified human region on the noise-removed input image.

20 Claims, 26 Drawing Sheets

| LEVEL | IMAGE SIZE | TIME REQUIRED | CUMULATIVE TIME |
|---|---|---|---|
| 0 (ORIGINAL IMAGE) | 320 x 240 | 1. 464 ms | 1.464 ms |
| 1 | 284 x 213 | 1. 152 ms | 2.616 ms |
| 2 | 252 x 189 | 0. 910 ms | 3.526 ms |
| 3 | 224 x 168 | 0. 718 ms | 4.244 ms |
| 4 | 199 x 149 | 0. 561 ms | 4.805 ms |
| 5 | 176 x 132 | 0. 440 ms | 5.245 ms |
| 6 | 156 x 117 | 0. 344 ms | 5.589 ms |
| 7 | 138 x 104 | 0. 268 ms | 5.857 ms |
| 8 | 122 x 92 | 0. 210 ms | 6.067 ms |
| 9 | 108 x 81 | 0. 166 ms | 6.233 ms |
| 10 | 96 x 72 | 0. 129 ms | 6.363 ms |
| 11 | 85 x 64 | 0. 101 ms | 6.464 ms |
| 12 | 75 x 56 | 0. 078 ms | 6.542 ms |
| 13 | 66 x 49 | 0. 060 ms | 6.602 ms |

FIG.20A

| MCT VALUE | (1,1) | (14,10) |
|---|---|---|
| 1 | 1.302622 | 0.315946 |
| 2 | 1.772520 | 0.000000 |
| 3 | 0.487639 | 0.000000 |
| 4 | 0.937634 | 0.831502 |
| 5 | 0.155170 | 0.361624 |
| 6 | 0.316182 | 0.793199 |
| 7 | 0.308015 | 0.469133 |
| 8 | 1.77252 | 0.839976 |
| 9 | 1.154538 | 0.686302 |
| 10 | 0.358852 | 0.000000 |
| ⁇ | ⁇ | ⁇ |
| 11 | 0.000000 | 0.993162 |
| 511 | 0.153845 | 0.485727 |

FIG.20B

| CONFIDENCE OF POINT (1,1) Q 8.8 FORMAT (16bits) CONVERSION EXAMPLE | | | |
|---|---|---|---|
| MCT VALUE | REAL NUMBER VALUE | INTEGER PART | DECIMAL PART |
| 1 | 1.302622 | 00000001 | 01001101 |
| 2 | 1.772520 | 00000001 | 11000101 |
| 3 | 0.487639 | 00000000 | 01111100 |
| 4 | 0.937634 | 00000000 | 11110000 |
| 5 | 0.155170 | 00000000 | 00100111 |
| 6 | 0.316182 | 00000000 | 01010000 |
| 7 | 0.308015 | 00000000 | 01001110 |
| 8 | 1.772520 | 00000001 | 11000101 |
| 9 | 1.154538 | 00000001 | 00100111 |
| 10 | 0.358852 | 00000000 | 01011011 |
| 11 | 0.000000 | 00000000 | 00000000 |
| ⁇ | ⁇ | ⁇ | ⁇ |
| 511 | 0.153845 | 00000000 | 00100111 |

METHOD AND APPARATUS OF DETECTING IMAGE OBJECTS

CROSS-REFERENCE(S) TO RELATED APPLICATION(S)

The present invention claims priority of Korean Patent Application No. 10-2009-0120391, filed on Dec. 7, 2009, which is incorporated herein by reference.

FIELD OF THE INVENTION

The present invention relates to an image object detection technique, and more particularly, to an apparatus and method of detecting image objects which are suitable for detecting a human region from an input image picked up by a camera.

BACKGROUND OF THE INVENTION

As well-known in the art, media for identification, such as a resident registration card, a driver's license, a student ID card, etc., is currently being used as representative means for individual identification, user authentication, and personal information protection. However, it may be difficult to identify someone unless he or she carries these identification medium. Thus, it is not easy to confirm the identity of a person, and a person can be identified in some cases even if the person who is carrying an identification media is not the actual ID holder.

To overcome this problem, the development of biometrics technique, such as fingerprint recognition, iris recognition, face recognition, etc., is underway. Among all of the biometrics techniques, the face recognition technique is becoming popular in various applications because it is relatively less mandatory for users compared to other biometrics information and is less repulsive due to its non-contact method.

Here, human detection technology including face recognition, which is one of the biometrics techniques and is the core technology of biometrics, has been studied since many years ago, has been applied as a detection technique for biometrics, and has been recently developed in more various ways together with the expansion of the market related to digital equipment, mobile devices, etc.

In such an environment, if a camera is mounted on digital equipment, a mobile device, or the like, and the human recognition technology including face recognition is applied, the enhancement of the added value of the products and sales growth may be expected. For instance, a mobile device, such as a mobile phone, can provide a function of detecting the position of a person, recognizing the face of the person through image processing, and then changing the expression on the face; and digital equipment, such as a digital camera, can provide a function of detecting the position of a person and focusing on the position of the person. Thus, the human recognition technology can be applied in combination with various techniques.

Meanwhile, human detection algorithms including face recognition have been so far developed in the form of an algorithm which operates mainly in a PC-based environment. When this technique was applied directly to an embedded system, the detection of a human in real time was impossible or the detection rate was low due to relatively poor resource and performance, thus making it difficult to effectively detect a human.

However, as the market for home robots, such as cleaning robots, toy robots for entertainment, etc., in daily life is growing owing to the expansion of the service robots area, and the application areas capable of using human biological information in portable equipment, such as a mobile phone, a digital camera, etc., are increasing, the necessity for a high-performance real-time human detection technique in an embedded system is increasing more and more.

The conventional human detection algorithms including face recognition, however, have the problem that the human detection performance is abruptly lowered due to changes in lighting, and an additional processing procedure is required in order to solve this problem. This results in an increase in the amount of calculation and an increase in mechanical complexity, thus making it difficult to mount the algorithms on any other hardware than PC-based hardware.

Moreover, these algorithms are hard to be commercialized because the implementation of hardware consumes a lot of resources, and, even if these algorithms are commercialized, an increase in processing time caused by the increase in the amount of calculation acts as a difficult problem in real-time processing. Therefore, there is a demand for the development of a real-time processing engine which is not a simple human detection algorithm but shows high detection performance because of its robustness against changes in lighting, and which can be implemented directly on hardware at a high processing speed.

SUMMARY OF THE INVENTION

In view of the foregoing, therefore, the present invention provides an apparatus and method of detecting image objects, which are capable of improving human detection performance by scaling an input image and converting the image by a modified census transform (MCT) method to detect a human region.

Further, the present invention provides an apparatus and method of detecting image objects, which are capable of improving the detection rate of a human region by enhancing the accuracy of human recognition due to robustness against image noise and changes in lighting, regardless of changes in the position and size of a human object in an input image picked up through a camera.

In accordance with a first aspect of the present invention, there is provided an apparatus of detecting image objects comprising:

a noise filtering block for dividing an input image into multiple regions and removing image noise in the input image to produce a noise-removed image;

an image scaling block for scaling the noise-removed input image to produce a scaled input image;

a memory control block for temporarily storing the noise-removed input image, and the scaled input image, wherein the noise-removed image and the scaled image being transferred as a first input image and a second input image, respectively;

an image conversion block for dividing the second input image into multiple regions and converting the divided image by a modified census transform (MCT) method;

a data processing block for comparing MCT values of the image converted by the MCT method with a preset threshold value, detecting at least one candidate region, and identifying a human region from said at least one detected candidate region; and an image output block for marking the identified human region on the first input image.

In accordance with a second aspect of the present invention, there is provided a method of detecting an image object comprising:

dividing an input image into multiple regions;

removing image noise in each divided input image;

storing the noise-removed input image;

scaling the noise-removed input image to produce a scaled input image, wherein the noise-removed input image and the scaled input image being transferred as a first input image and a second input image, respectively;

converting the second image by a modified census transform (MCT) method;

comparing MCT values of the image converted by the MCT method with a preset threshold to detect at least one candidate region; and identifying a human region from said at least one detected candidate region; and marking the identified human region on the first input image.

BRIEF DESCRIPTION OF THE DRAWINGS

The above and other objects and features of the present invention will become apparent from the following description of embodiments, given in conjunction with the accompanying drawings, in which:

FIGS. 20A and 20B are tables illustrating confidence values depending on MCT values and the conversion thereof in accordance with an embodiment of the present invention;

DETAILED DESCRIPTION OF THE EMBODIMENTS

As will be described below, the present invention involves removing noise of an input image, storing it, scaling the stored input image, converting the scaled image by an MCT method, detecting candidate regions from the converted image using MCT values, identifying a human region from the detected candidate regions, and marking the identified human region, which contributes to solve problems of the prior arts.

Hereinafter, embodiments of the present invention will be described in detail with reference to the accompanying drawings.

Figure 1:
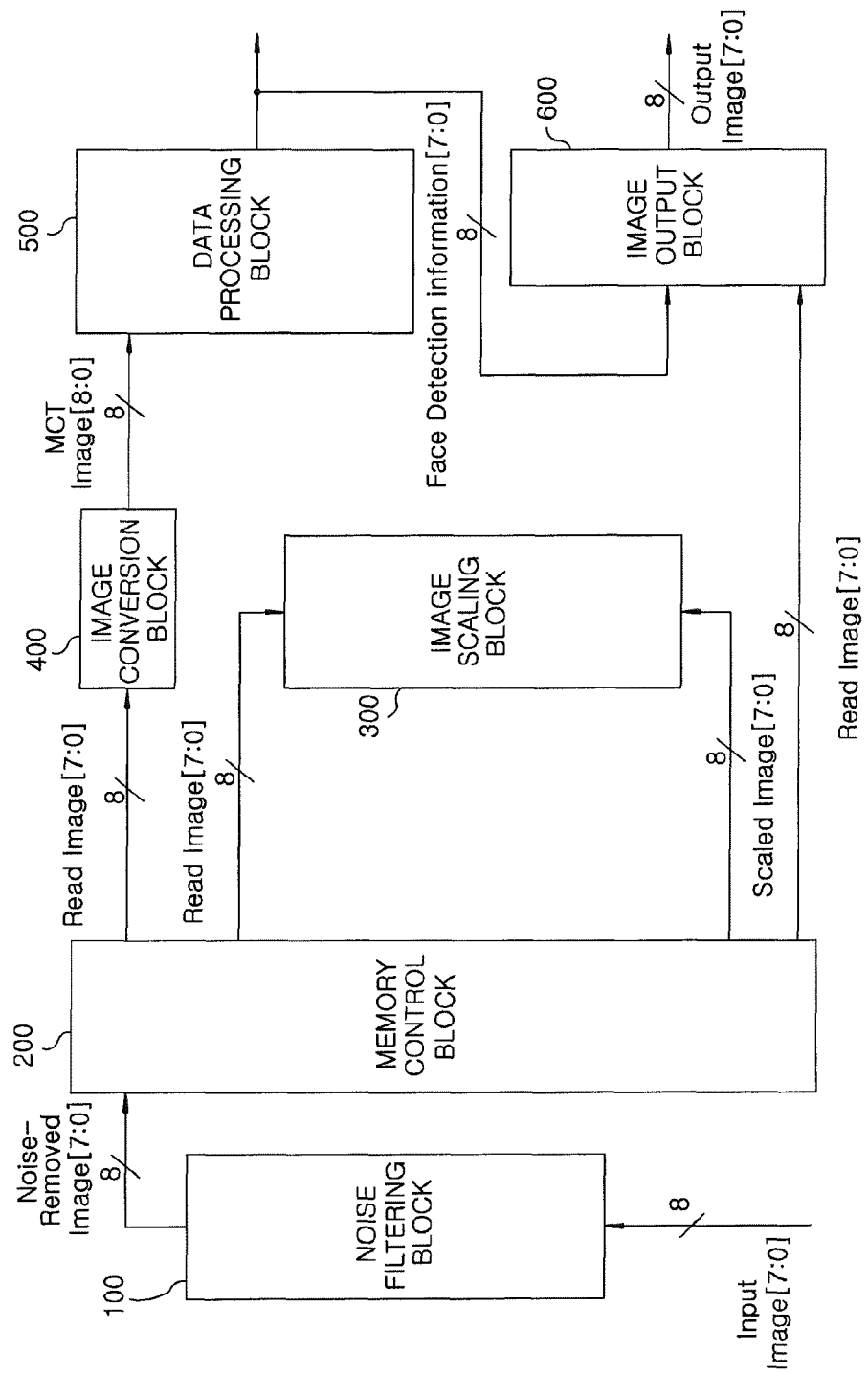
FIG. 1 shows a block diagram of an image object detection apparatus suitable for detecting a human region from an input image in accordance with an embodiment of the present invention.

FIG. 1 is a block diagram of an image object detection apparatus suitable for detecting a human region from an input image in accordance with an embodiment of the present invention. The image object detection apparatus shown in FIG. 1 includes a noise filtering block 100, a memory control block 200, an image scaling block 300, an image conversion block 400, a data processing block 500, and an image output block 600.

When an input image is provided from a camera, the noise filtering block 100 filters the input image. More specifically, the noise filtering block 100 stores temporarily the input image in an internal memory thereof (not shown), extracts the input image and divides the input image into multiple regions (e.g., 9 (or 3*3) regions), removes noise from each divided region in the input image, and then outputs the noise-removed input image to the memory control block 200.

In this regard, the input image is picked up through at least one camera for picking up a subject using, for example, a CMOS module, a CCD module, or the like. The picked-up image (or video) is provided to a CCD module or a CMOS module through a lens. Then, the CCD module or the CMOS module converts an optic signal of the subject passing through the lens into an electric signal (pickup signal). Thereafter, the electrical signal is subject to such functions of a camera as an exposure, gamma and gain adjustment, white balance and color matrix, and then converted into a digital signal through an analog-to-digital converter (ADC).

The memory control block 200 stores temporarily the noise-removed input image in an internal memory (not shown), extracts the stored input image and provides it to the image output block 600. Further, the memory control block 200 receives a scaled input image from the image scaling block 300, and provides it to the image conversion block 400. For instance, the noise-removed input image is stored alternately in two internal memories, for example, and each extracted input image from the respective two internal memories is transferred to the image scaling block 300 for image scaling, the original input image (hereinafter referred to as a first input image) is output to the image output block 600, and the scaled input image (hereinafter referred to as a second input image) by the image scaling block 300 is output to the image conversion block 400. That is, the memory control block 200 stores and manages consecutively input images in high-speed and transfers them to other component blocks, thereby properly performing a human detection operation. The high-speed input images are alternately stored in at least two internal memories for storing the original image, thereby performing a human detection operation regardless of delay time caused by the processing of the input image.

The image scaling block 300 scales the input image in horizontal and vertical directions and outputs it. The image scaling block 300 horizontally scales the input image transferred from the memory control block 200 line by line and stores it, extracts the horizontally scaled input image and vertically scales the image line by line, and transfers the horizontally and vertically scaled input image (i.e., the second input image) to the memory control block 200.

The image conversion block 400 divides the transferred second input image into multiple regions and converts the image using an MCT method. The image conversion block 400 stores temporarily the scaled input image transferred from the memory control block 200, extracts the stored scaled input image, divides the scaled input image into multiple (e.g., 9 (or 3*3)) regions, and converts the scaled input image by the MCT method for representing relations between each of the divided regions and peripheral regions as numerical values to yield the converted image. By image conversion using this MCT method, adverse effects caused by changes in lighting during image object detection can be reduced, and such a converted image may contain MCT values which are numerically quantified by region.

The data processing block 500 searches for candidate regions using the MCT values extracted by scanning the converted image and detects a human region from the detected candidate regions. More specifically, the data processing block 500 scans the entire region for the converted input image transferred from the image conversion block 400 while moving a search window having 20*20 pixel regions for searching a candidate region for the converted image on one-pixel basis in each up, down, left and right direction, transfers MCT values of 400 pixels corresponding to the 20*20 pixel regions where the detection window is located by the scanning of the entire regions, and then compares a cumulative MCT value of the 400 MCT values stored in the internal memory with a preset threshold value. In comparison, if the cumulative MCT value is relatively lower than the preset threshold value, the data processing block 500 detects the corresponding region as a candidate region. Here, the preset threshold value is a value which has been learned offline in advance, and refers to a value that is set for identifying a candidate region as a human region when an MCT value is relatively lower than a specific probability value.

Also, the data processing block 500 repetitively performs a process of calculating the position of a region detected as a candidate region in the converted input image of 320*240 size, for example, and figuring out the position and size of the candidate region, performs comparative calculation between the previous candidate image and the current candidate image. In comparative calculation, if the candidate region is identified more than a preset number of times in a specific position and its peripheral regions, the data processing block 500 identifies the corresponding candidate region as a human region and provides the coordinates of the identified human region and the size thereof to the image output block 600.

The image output block 600 marks the human region on the input image based on the coordinates and size of the identified human region. That is, the image output block 600 stores temporarily the coordinates and size of the human region, extracts them, applies the coordinates and size of the human region to the original input image (i.e., the first input image) transferred from the memory control block 200 to perform the marking of a human region in a box shape, for example, and outputs the image having the marked human region.

To be more specific, the image output block 600 generates, for example, 32 region marks in a box shape, for example, in the original input image transferred from the memory control block 200 using the coordinates and size of the human region transferred from the data processing block 500, and combines these region marks with the original input image.

Accordingly, it is possible to effectively detect a human region from an original input image by removing noise of the input image, scaling the input image, converting the scaled input image by the MCT method, searching candidate regions from the converted image using MCT values, identifying the human region from the detected candidate regions, and marking the identified human region on the original input image.

Figure 2:
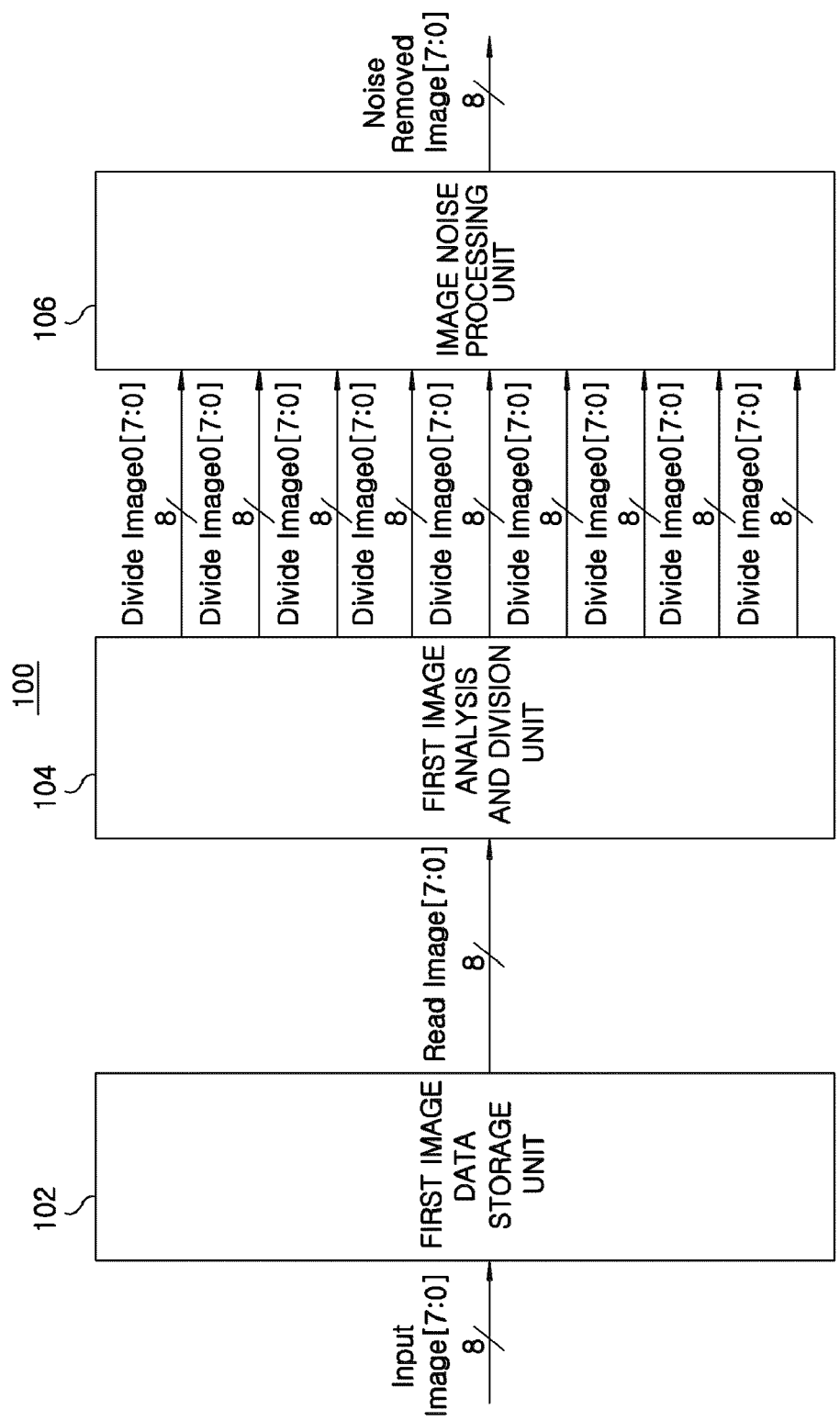
FIG. 2 illustrates a block diagram of a noise filtering block, shown in FIG. 1, suitable for removing noise of an input image in accordance with an embodiment of the present invention.

FIG. 2 illustrates a detailed block diagram of the noise filtering block, shown in FIG. 1, suitable for removing noise of an input image in accordance with an embodiment of the present invention. As shown therein, the noise filtering block 100 includes a first image data storage unit 102, a first image analysis and division unit 104, and an image noise processing unit 106.

Referring to FIG. 2, the first image data storage unit 102 stores an input image provided from a camera in an internal memory thereof.

The first image analysis and division unit 104 reads the input image from the first image data storage unit 102 and then divides the input image into multiple (e.g., 9 (or 3*3)) regions and produces the divided regions of the input image to the image noise processing unit 106.

Next, the image noise processing unit 106 removes image noise by region for the input image which is divided into multiple regions, and then outputs the noise-removed input image to the memory control block 200.

Therefore, the noise filtering block 100 is able to effectively producing a noise-removed input image by storing the input image input through the camera, dividing it into multiple regions of the input image, and removing image noise by divided region.

That is, when the input image is acquired by a camera and then is provided to the noise removal block 100. Image noise may be introduced into the input image depending on the performance of the camera for acquiring the input image. If relatively large noise is present in the input image, an erroneous detection of an image occurs, and this erroneous detection image becomes fatal to image detection performance. Thus, by filtering noise of the input image, erroneous detection of an image is prevented, thus improving the image detection performance.

Next, in the image object detection apparatus having the aforementioned configuration, the memory control block for storing a noise-removed input image in an input memory, extracting and outputting the stored input image, and extracting and outputting a scaled input image will be described.

Figure 3:
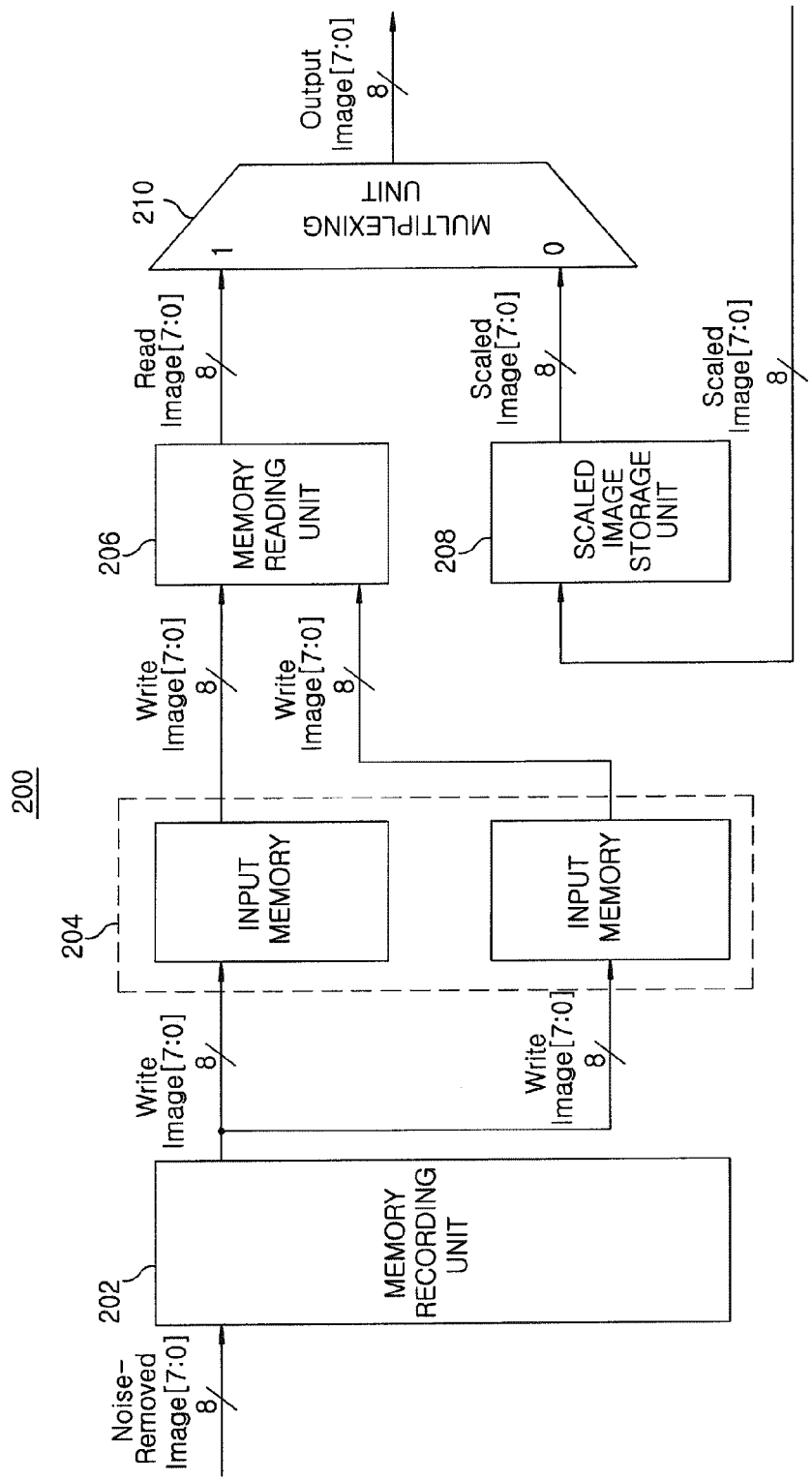
FIG. 3 illustrates a block diagram of a memory control block, shown in FIG. 1, suitable for storing an input image in a memory and outputting a scaled input image in accordance with an embodiment of the present invention.

FIG. 3 illustrates a detailed block diagram of the memory control block 200 shown in FIG. 1 suitable for producing a scaled input image in accordance with an embodiment of the present invention. The memory control block 200 includes a memory recording unit 202, an input memory unit 204, a memory reading unit 206, a scaled image storage unit 208, and a multiplexing unit 210.

The memory recording unit 202 receives and writes temporarily the noise-removed input image transferred from the noise removal block 100 in the input memory unit 204. Here, the input memory unit 204 is composed of, for example, two input memories, and the input image in sequence by the memory recording unit 202 can be stored alternately the two input memories. For example, a current frame of a noise-removed image is stored in any one memory in which a noise-removed image before two frames has been stored, out of the two input memories; and a noise-removed input image of a previous frame may be read from the other memory storing images before one frame.

The memory reading unit 206 extracts alternately the input image from each one input memory in the input memory unit 204, and provides the input image to the multiplexing unit 210 to transfer it as the first input image to the image conversion block 400, and to transfer it to the image scaling block 300 in order to scale the image.

The scaled image storage unit 208 stores temporarily the scaled input image (i.e., the second input image) transferred from the image scaling block 300 therein, and then extracts the scaled input image to provide it to the multiplexing unit 210 for transferring it to the image conversion block 400.

The multiplexing unit 210 includes, for example, a multiplexer or the like. A currently processed input image is obtained by initially outputting an unscaled input image (e.g., 320*240 size) once ('1' of FIG. 3), sequentially scaling down the corresponding input image, and inputting the sequentially scaled-down images instead of the initially output input image ('0' of FIG. 3) in order until the input image has a minimum size for image processing. Then, the original input image (i.e., first input image) and the scaled input image (i.e., second input image) are selectively multiplexed and output to the image scaling block 300, the image conversion block 400, and the image output block 600, respectively.

Next, in the image object detection apparatus having the aforementioned configuration, the image scaling block 300 for horizontally and vertically scaling the input image will be described.

Figure 4:
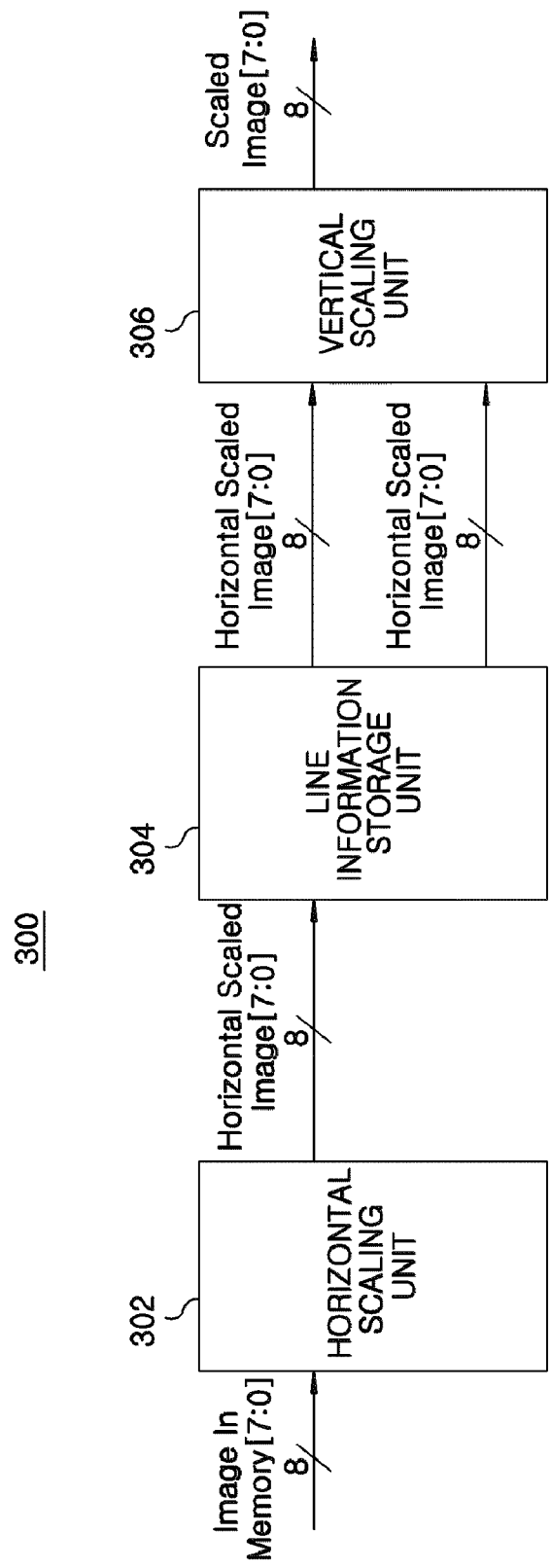
FIG. 4 depicts a block diagram of an image scaling block, shown in FIG. 1, suitable for scaling and outputting an input image in accordance with an embodiment of the present invention.

FIG. 4 provides a detailed block diagram of the image scaling block 400 shown in FIG. 1 suitable for scaling an input image in accordance with an embodiment of the present invention. The image scaling block 300 includes a horizontal scaling unit 302, a line information storage unit 304, and a vertical scaling unit 306.

Referring to FIG. 4, the horizontal scaling unit 302 horizontally scales the input image transferred from the memory control block 200 on a line basis and stores it in the line information storage unit 404.

The line information storage unit 404 extracts the horizontally scaled input image and outputs the horizontally scaled input image to the vertical scaling unit 306.

Next, the vertical scaling unit 306 vertically scales the horizontally scaled input image on a line basis, and then transfers the scaled input image (i.e., the second input image) to the memory control block 200.

Thus, the image scaling block 300 is able to effectively output the scaled input image by scaling the input image along a horizontal line and scaling the image along a vertical line.

That is, the image scaling block 300 is capable of scaling the input image at high speed and detecting humans of various sizes using the scaled input image. At this time, the input image may be scaled in various ways based on an image scale-down (or scale-up) ratio, the time required, and the cumulative time required.

Next, the image conversion block 400 for dividing the input image into multiple regions, converting the divided image by an MCT method in the image object detection apparatus having the aforementioned configuration will be described.

Figure 5:
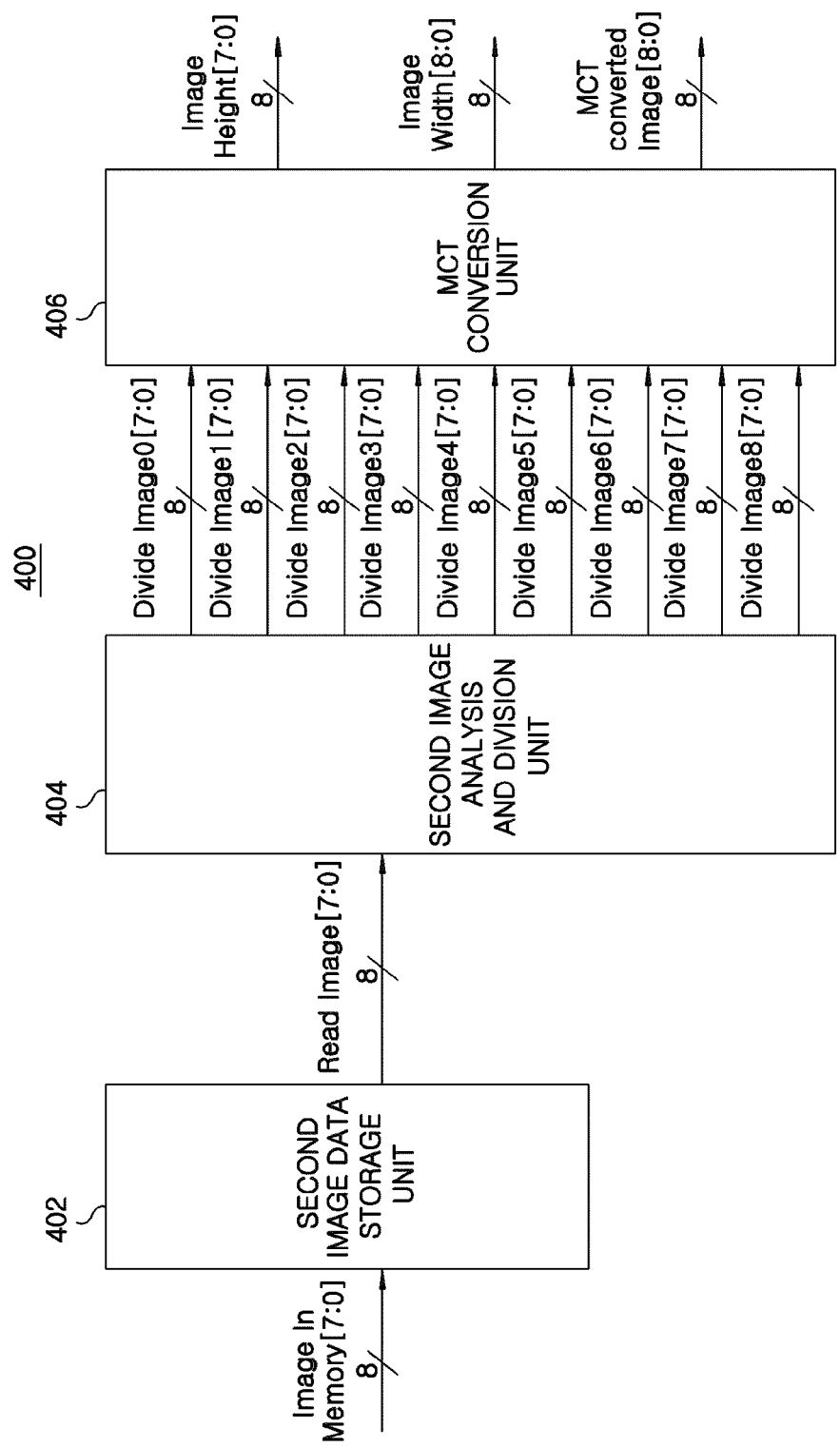
FIG. 5 provides a block diagram of an image conversion block, shown in FIG. 1, suitable for converting an input image by region and outputting the converted image in accordance with an embodiment of the present invention.

FIG. 5 shows a detailed block diagram of the image conversion block 400 shown in FIG. 1 suitable for converting an input image by region to produce the converted image in accordance with an embodiment of the present invention. The image conversion block 400 includes a second image data storage unit 402, a second image analysis and division unit 404, and an MCT conversion unit 406.

The second image data storage unit 402 stores temporarily the first input image transferred from the memory control block 200 therein.

The second image analysis and division unit 404 reads the stored first input image from the second image data storage unit 402 and divides the read first input image into multiple regions (e.g., 9 (or 3*3) regions) to produce the divided regions of the first input image to the MCT conversion unit 406.

Next, the MCT conversion unit 406 converts the image by the MCT method for representing relations between each of the divided regions from the first input image and peripheral regions as numerical values to produce the converted image. By image conversion using this MCT method, adverse effects caused by changes in lighting during the image object detection can be reduced, and such a converted image may contain MCT values which are represented by numbers by region.

For instance, the MCT conversion unit 406 adds pixel values in the image of the divided regions (e.g., 9 (or 3*3) regions) to calculate the sum and mean of the pixel values, allocates 0 to each pixel if the image value of the corresponding region is relatively smaller than the calculated mean or allocates 1 to each pixel if the image value of the corresponding region is relatively greater than the calculated mean. Further, the MCT conversion unit 406 converts the image value into an integer to determine an MCT conversion value, and outputs an image converted depending on the determined MCT conversion value.

Figure 6:
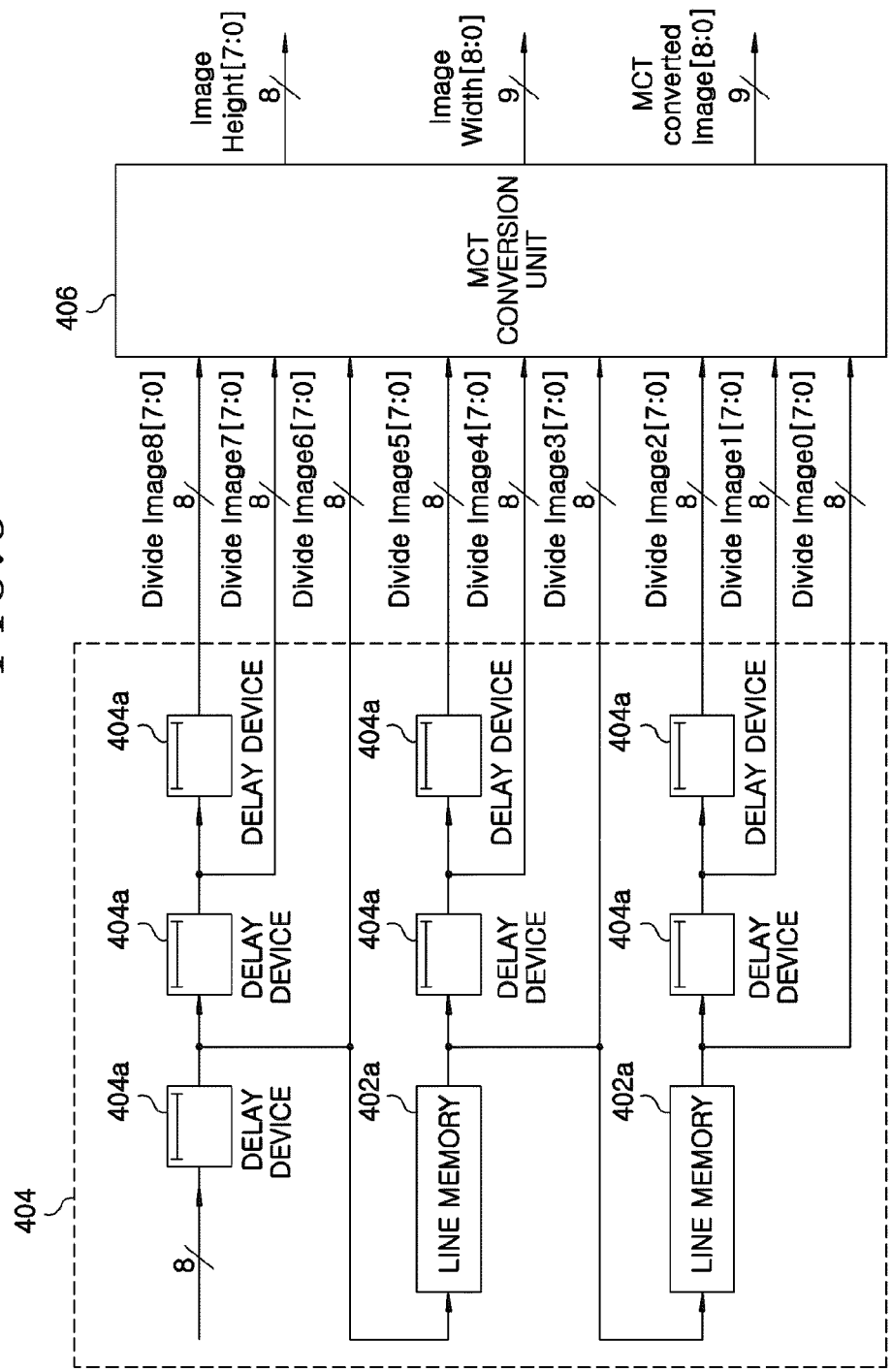
FIG. 6 is a block diagram illustrating the configuration of the image conversion block, shown in FIG. 1, in accordance with an embodiment of the present invention.

Meanwhile, FIG. 6 is a detailed block diagram of the second image analysis and division unit 404 in the image conversion block 400 shown in FIG. 5, which shows a detailed operation of storing an input image and then dividing the input image into 9 image values by using two line memories 402a and seven delay devices 404a included therein. It can be seen that the input image is divided into 3 matrices through the line memories 402*a* and then divided into three columns through the delay devices 404*a*, and as a result the image values of 9 (nine) divided regions, Divide Image 8, . . . . Divide Image 0, are simultaneously input into the MCT conversion unit 406.

Therefore, the image conversion block 400 is capable of effectively providing an image robust against changes in lighting by dividing the input image into multiple regions, converting the input image of the divided regions by the MCT method, thereby obtaining the converted image.

Next, the data processing block 500 for scanning a converted image, transferring MCT values, detecting candidate regions using the transferred MCT value, and identifying a human region from the detected candidate regions and outputting the human region in the image object detection apparatus having the aforementioned configuration will be described.

Figure 7:
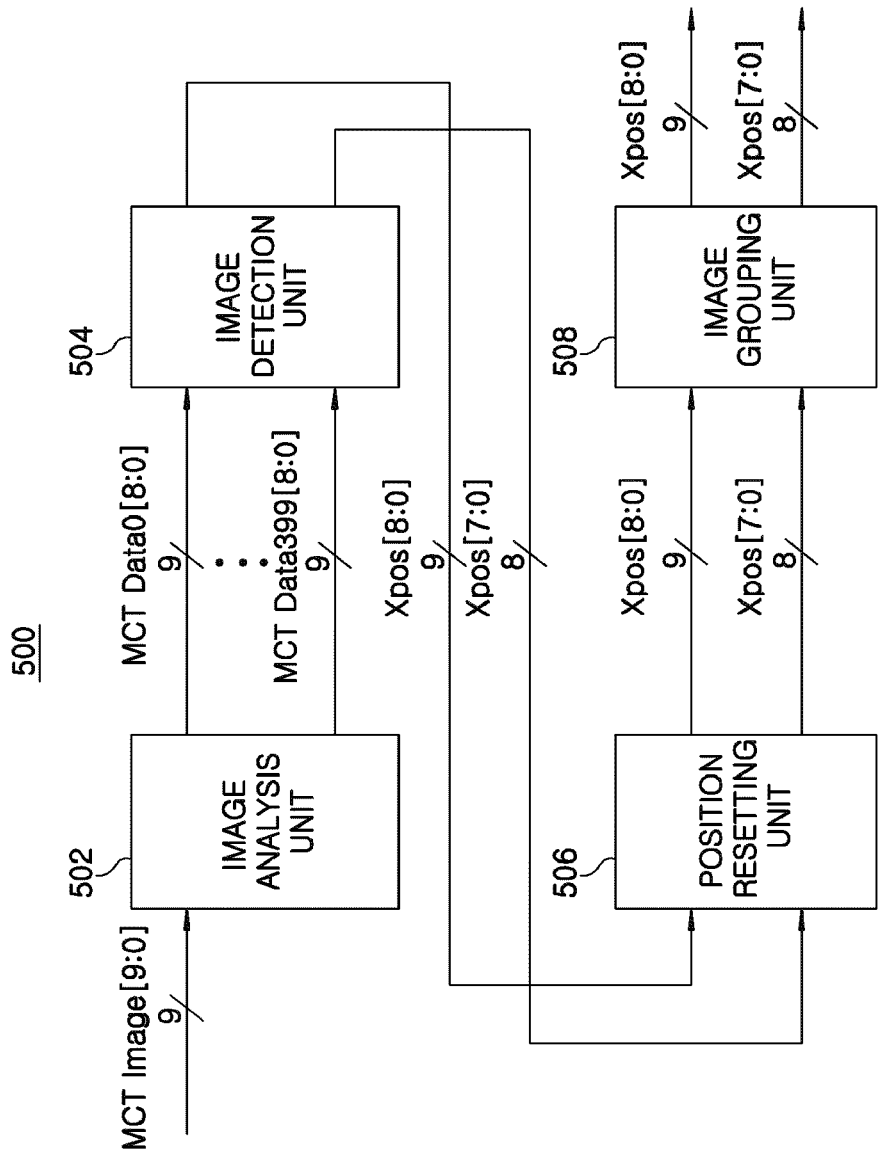
FIG. 7 offers a block diagram of a data processing block, shown in FIG. 1, suitable for detecting a human region using MCT values of a converted image in accordance with an embodiment of the present invention.

FIG. 7 depicts a detailed block diagram of the data processing block 500 shown in FIG. 1 suitable for detecting a human region using MCT values of the converted image in accordance with an embodiment of the present invention. The data processing block 500 includes an image analysis unit 502, an image detection unit 504, a position resetting unit 506, and an image grouping unit 508.

Referring to FIG. 7, the image analysis unit 502 scans the entire regions of the converted image transferred from the image conversion block 400 while moving a search window for detecting a candidate region on one pixel basis in up, down, left and right directions, and transfers MCT values, MCT Data0 to MCT Data399, of 400 pixels corresponding to 20*20 regions where the detection window is located by the scanning of the entire regions.

The image detection unit 504 compares a cumulative MCT value of the 400 MCT values with a preset threshold, and then, if the cumulative MCT value is relatively lower than the preset threshold, detects the corresponding detected region as a candidate region. Here, the preset threshold is a value which has been learned offline in advance, and refers to a value that is set for identifying a candidate region as a human region when an MCT value is relatively lower than a specific probability value.

That is, the image detection unit 504 calculates 400 probability values corresponding to respective MCT values and adds them by using the 400 MCT values of the search window corresponding to 20*20 regions transferred from the image analysis unit 502, and compares the sum of the probability values with the preset threshold to determine whether or not each search window contains human information.

Figure 8:
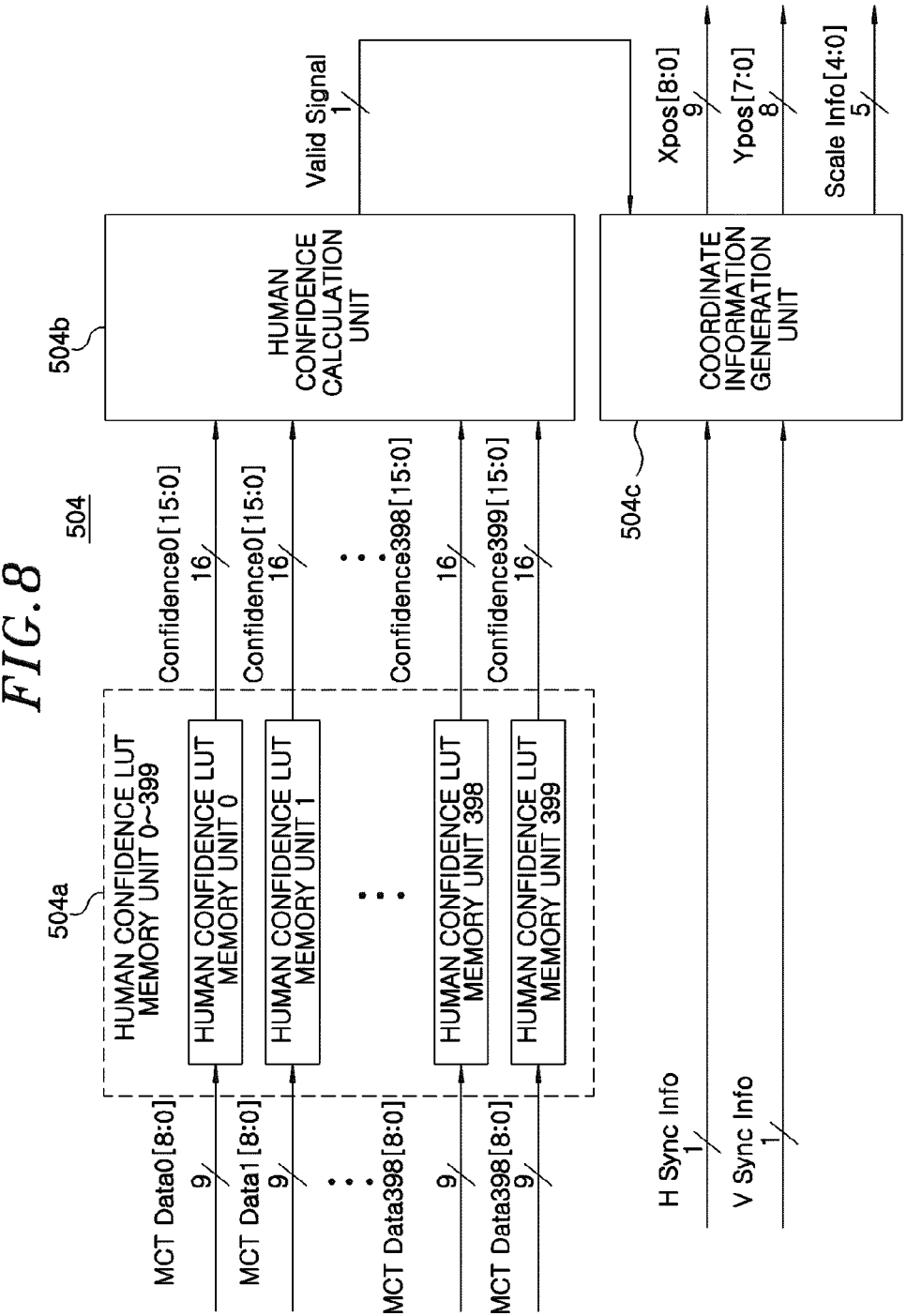
FIG. 8 presents a block diagram illustrating the configuration of an image detection unit, shown in FIG. 7, in accordance with an embodiment of the present invention.

In one example, FIG. 8 is a detailed block diagram of the image detection unit 504 shown in FIG. 7. The image detection unit 504 includes a human confidence memory unit 504*a*, a human confidence calculation unit 504*b*, and a coordinate information generation unit 504*c*. In the image detection unit 504, the human confidence memory unit 504*a* stores the probability values or the MCT values in 400 human confidence memories 0~399, respectively.

The human confidence calculation unit 504*b* adds the probability values, compares the sum of the probability values with a preset threshold value, identifies a human candidate region if the sum of the probability values is relatively smaller than the preset threshold, and transfers a signal, Valid Signal, resulting from the identification to the coordinate information generation unit 504*c*.

Subsequently, in response to the valid signal, the coordinate information generation unit 504*c* generates position information (i.e., x and y coordinates of the left top corner) (Xpos and Ypos) of the search window and an image scaling information, Scale Info, signal of the image scaled by the image scaling block 300 based on horizontal and vertical sync information (H Sync Info and V Sync Info) transferred from the memory control block 200, which are indicative of candidate region information.

Next, referring again FIG. 7, the position resetting unit 506 repetitively performs a process of calculating the position of a region detected as a candidate region in an input image of, e.g., 320*240 size, and figuring out the position and size of the candidate region. Here, the region detected as a candidate region can be reset to the position and size corresponding to the image size.

That is, the position resetting unit 506 is adapted to calculate the position and size of the detected candidate region in an input image of 320*240 size. The position resetting unit 506 can reset the position in a finally output image by calculating the position and size corresponding to the original image if the candidate region is detected from a scaled-down image in order to detect a human region in an input image having the original size and a scaled input image as well.

Figure 9:
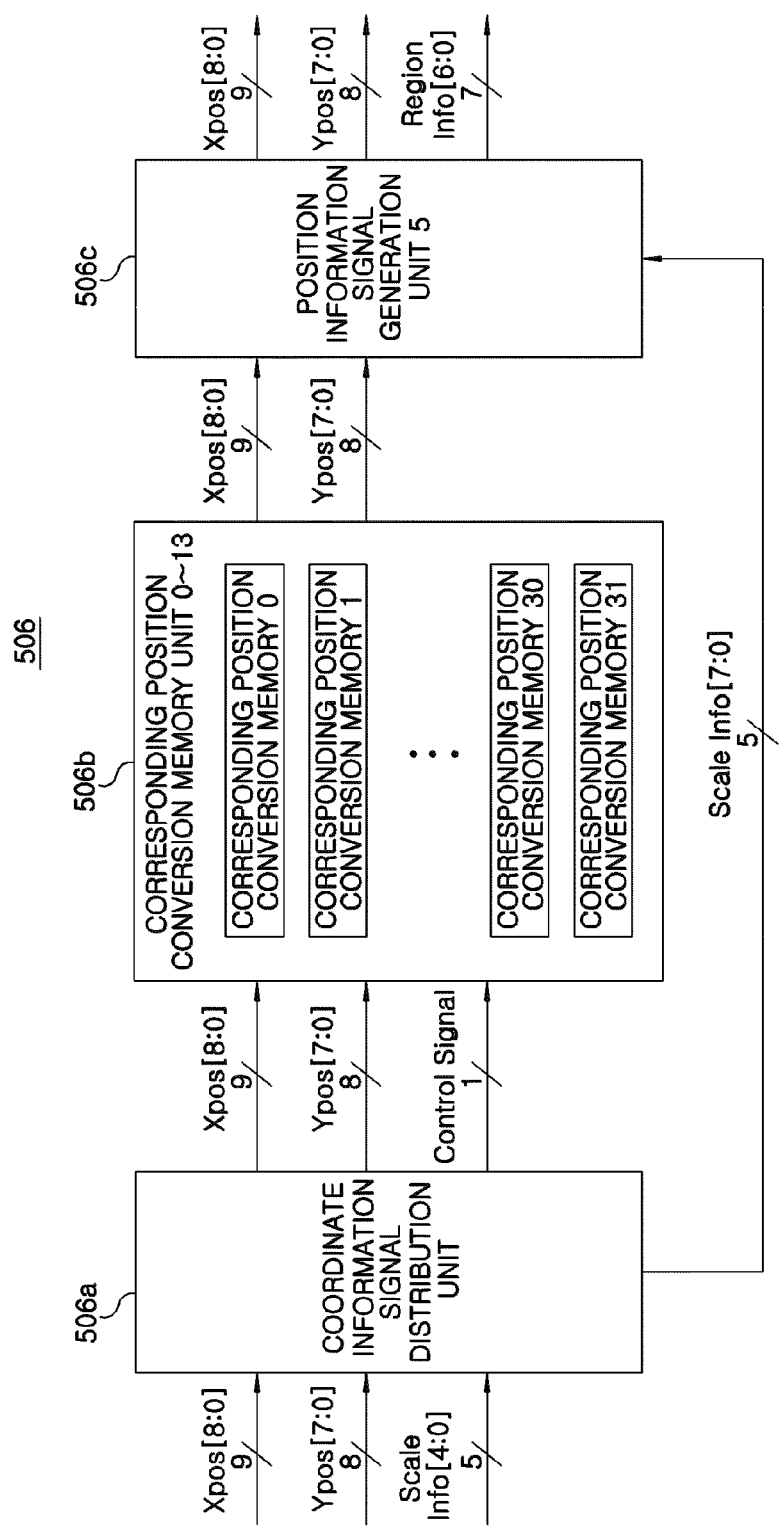
FIG. 9 is a block diagram illustrating the configuration of a position resetting unit, shown in FIG. 7, in accordance with an embodiment of the present invention.

In one example, FIG. 9 is a detailed block diagram of the position resetting unit 506 shown in FIG. 7. The position resetting unit 506 shown therein includes a coordinate information signal distribution unit 506*a*, a corresponding position conversion memory unit 506*b*, and a position information signal generation unit 506*c*. The coordinate information signal distribution unit 506*a* transfers coordinate information (Xpos and Ypos) of a candidate region transferred from the image detection unit 504, along with a control signal (Control Signal), to the corresponding position conversion memory unit 506*b* based on the image scaling information in order to calculate the corresponding position in the original image size, so that converted position coordinates (Xpos and Ypos) can be transferred to the position information signal generation unit 506*c*.

Then, the position information signal generation unit 506*c* can generate the x and y coordinates (Xpos and Ypos) of the left top corner of the detection region display window and window size information (Region Info) signal by using the converted position coordinates and the image scaling information. These processes can be repeatedly performed on multiple candidate regions.

Next, in FIG. 7, the image grouping unit 508 performs comparative calculation between the previous candidate image and the current candidate image that are transferred based on a result of repetitively performing the process of figuring out the position and size of a candidate region, and, if a specific position and its peripheral regions are identified as a candidate region more than a preset number of times by comparative calculation, identifies the corresponding candidate region as a human region and outputs it.

That is, if a specific position and its peripheral regions are identified as a candidate region, for example, more than three times, the image grouping unit 508 identifies the candidate region as an actual human region, and thus prevents the occurrence of an error of recognizing a non-human region as a human region, thereby ensuring robustness against human detection even with various background changes to indoor and outdoor environments.

Figure 10:
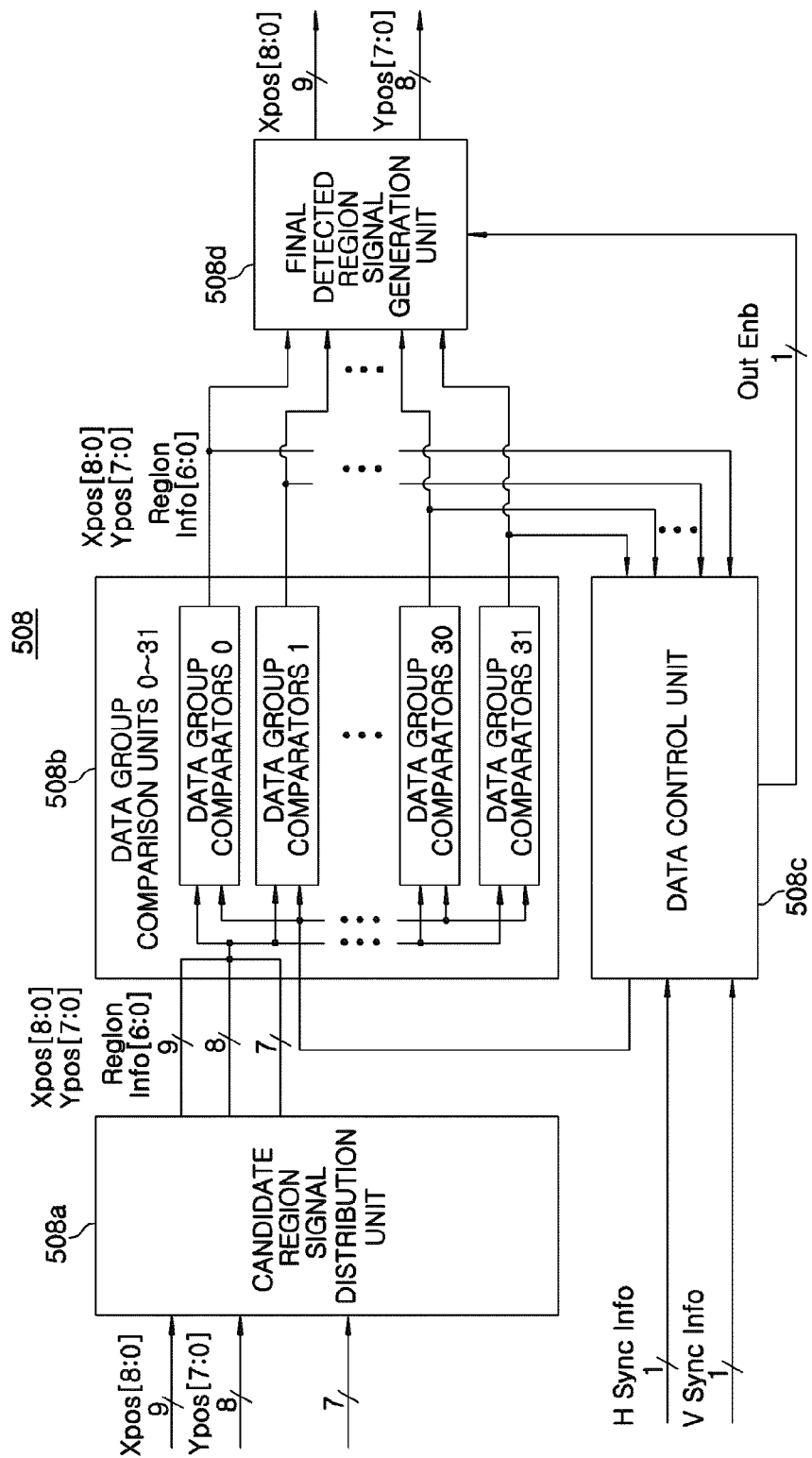
FIG. 10 is a block diagram illustrating the configuration of an image grouping unit, shown in FIG. 7, in accordance with an embodiment of the present invention.

In one example, FIG. 10 is a detailed block diagram of the image grouping unit 508 shown in FIG. 7. The image grouping unit 508 includes a candidate region signal distribution unit 508*a*, a data group comparison unit 508*b*, a data control unit 508*c*, and a final detected region signal generation unit 508*d*. The candidate region signal distribution unit 508*a* distributes and transmits the x and y coordinates of the left top corner of a detected region and window size information signal (Region Info) to 32 respective data group comparators 508b, and the data group comparators 508b configured to simultaneously detect 32 different human image compare respective detected candidate region information and feedback the information to the data control unit 508c. The data control unit 508c controllably transmits it to the data group comparators 508b for comparison and grouping.

Then, the data control unit 508c analyzes the horizontal and vertical sync information (H Sync Info and V Sync Info) transferred from the memory control block 200, and generates an enable signal (Out Enb) for validating output data of the data group comparison unit 508b upon completion of the comparison of detected candidate regions in one frame and transfers it to the final detected region signal generation unit 508d. The final detected region signal generation unit 508d can output 32 final detected region information transferred from the data group comparison unit 508b in response to the transferred enable signal from the data control unit 508c.

Therefore, the data processing block can detect candidate regions depending on MCT values by scanning a converted image, detecting candidate regions using the transferred MCT values, and identifying a human region from the detected human regions, and can effectively identify a human region by comparative calculation between the detected candidate regions.

Next, in the image object detection apparatus having the aforementioned configuration, the image output block 600 for marking an identified human region on an input image based on the coordinates and size of the human region will be described.

Figure 11:
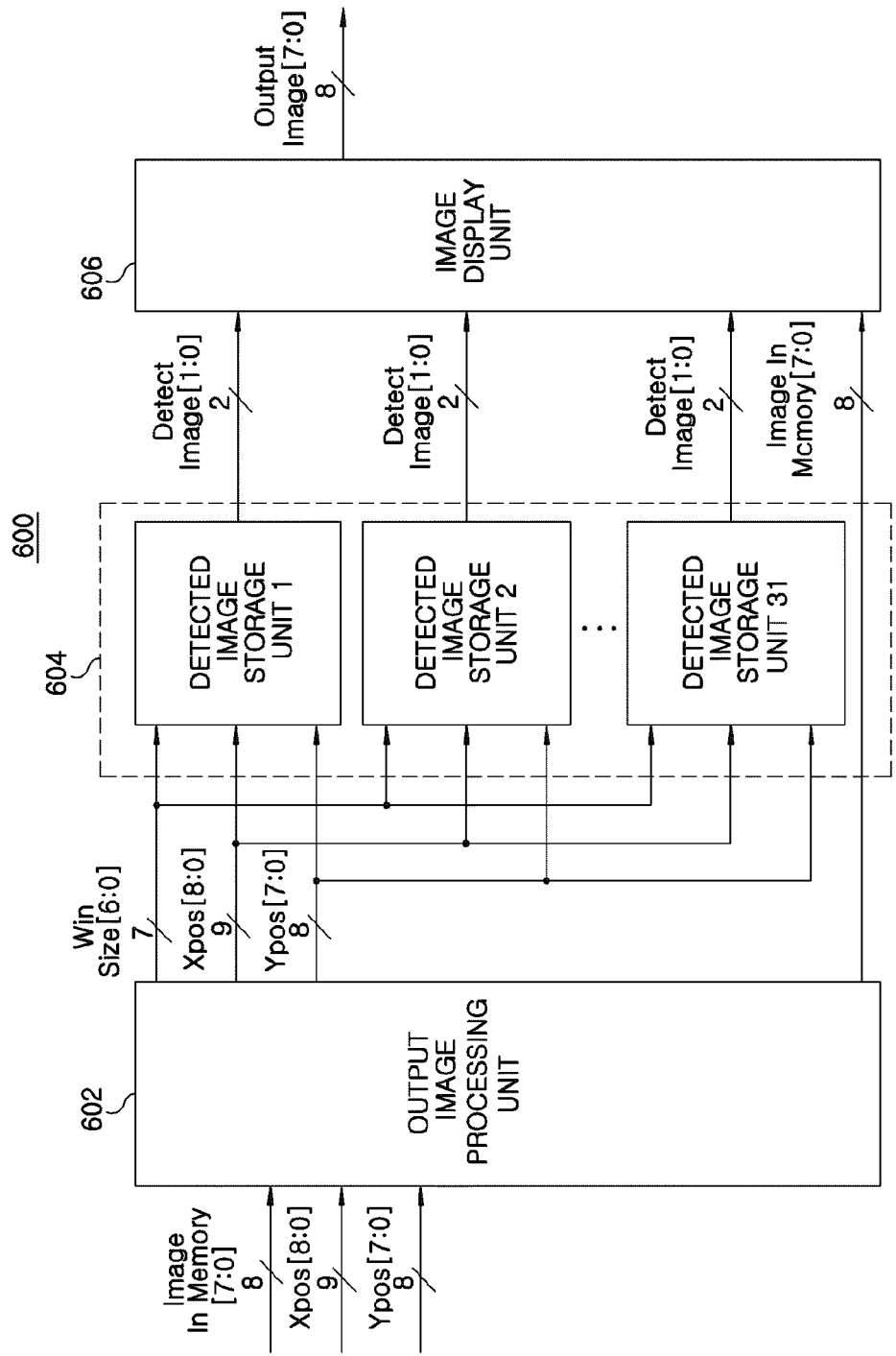
FIG. 11 is a block diagram of an image output block, shown in FIG. 1, suitable for marking a human region on an input image in accordance with an embodiment of the present invention.

FIG. 11 provides a detailed block diagram of the image output block 600 shown in FIG. 1 suitable for marking a human region on an input image in accordance with an embodiment of the present invention. The image output lock 600 includes an output image processing unit 602, a detected image storage unit 604, and an image display unit 606.

Referring to FIG. 11, the output image processing unit 602 divides human region information (or face detection information) (e.g., coordinates (Xpos, Ypos), and sizes (Win Size) of human regions) on, for example, 32 human regions provided from the data processing block 500 and provides them to the detected image storage unit 604.

Then, the detected image storage unit 604 stores the human region information on human regions. Here, the human region information may be stored in the corresponding respective internal memories (e.g., 32 internal memories) if there is multiple (e.g., 32) detected human regions, and the respective human region information is read-out from these internal memories.

That is, the detected image storage unit 604 may be composed of, for example 32 independent storage units for performing the same storage function. For instance, 32 detected human region information transferred from the output image processing unit 602 are divided and stored in the 32 independent detected image storage units 0 to 31, respectively, and each of the stored, detected human region information can be displayed in the shape of a box, for example, on a temporary image as will be described with reference FIG. 22.

Next, the image display unit 606 combines the original input image (i.e., the first input image) from the memory control block 200 with a human detected region displayed in a box, for example, in order to represent an image indicating the human region.

Therefore, the image output block 600 applies the coordinates and size of a detected human region to the original input image to display the human region, thereby making it easy to recognize the detected human region in the input image.

Next, a process of identifying a human region on the input image in the image object detection apparatus having the aforementioned configuration will be described.

Figure 12:
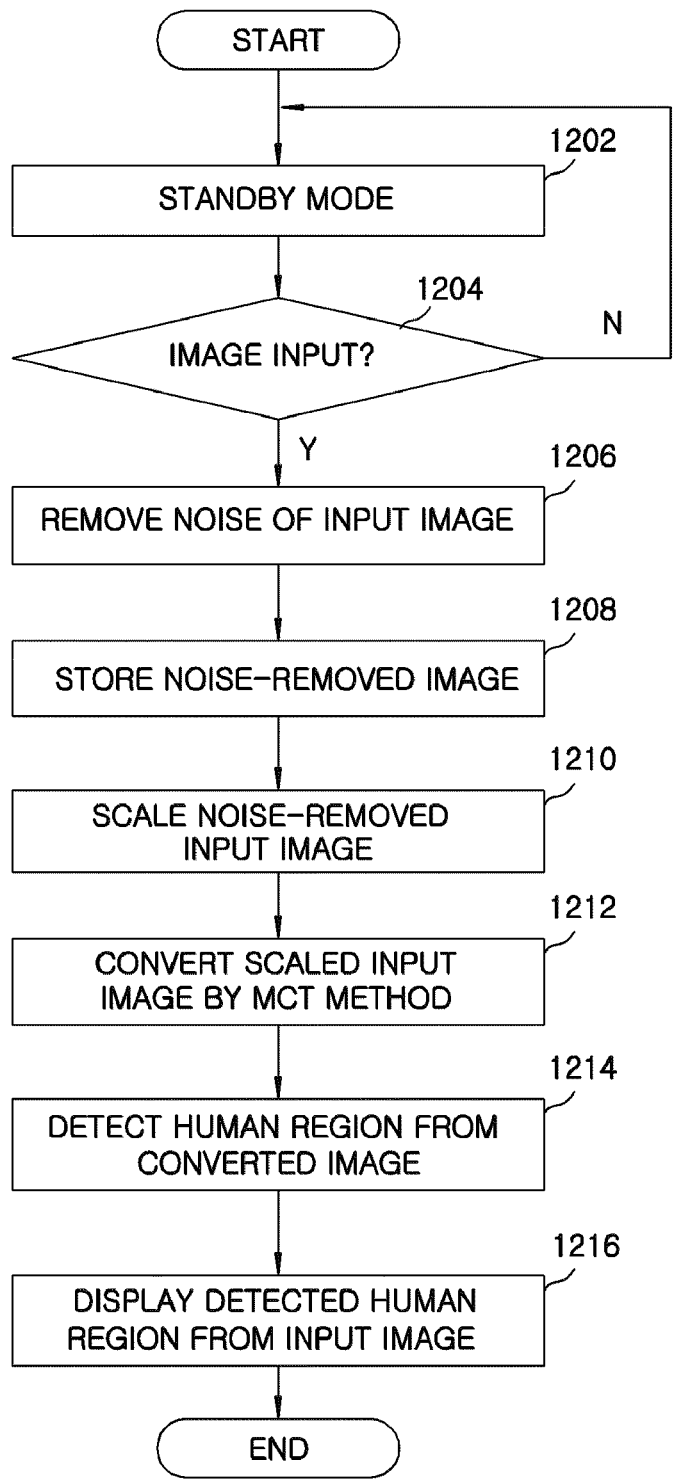
FIG. 12 illustrates a flowchart showing a process of detecting a human region in an input image in accordance with an embodiment of the present invention.

FIG. 12 is a flowchart showing a process of detecting a human region from an input image in accordance with a first embodiment of the present invention.

As shown in FIG. 12, the process begins in step 1202 of a standby mode of the image object detection apparatus, and the noise filtering block 100 checks if an image picked up by a camera is input in step 1204.

As a result of checking in step 1204, when a picked-up image is input, the noise removal block 100 stores the picked-up input image in the internal memory, divides the input image into multiple (e.g., 9 (or 3*3)) regions, and removes noise of the input image by divided regions in step 1206.

The memory control block 200 stores the noise-removed input image by the noise filtering block 100 in, for example, two input memories, respectively, in step 1208. Here, each input image is transferred to the image scaling block 300 for image scaling, the original input image (a first input image) is provided to the image output block 600, and the input image (a second input image) scaled by the image scaling block 300 is provided to the image conversion block 400.

Next, in step 1210, the image scaling block 300 horizontally scales the input image transferred from the memory control block 200 line by line and stores it, and vertically scales the horizontally scaled image line by line. Here, the horizontally and vertically scaled input image is transferred to the memory control block 200, which in turn transfers the scaled input image (i.e., the second input image) to the image conversion block 400.

Subsequently, in step 1212, the image conversion block 400 stores the second input image from the memory control block 200, divides the image into multiple (e.g., 9 (or 3*3)) regions, for example, and converts the image by using the MCT method for representing relations between each of the divided regions and peripheral regions as numerical values. By image conversion using this MCT method, adverse effects caused by changes in lighting during image object detection can be reduced, and such a converted image may contain MCT values which are represented by numbers by region.

Thereafter, in step 1214, the data processing block 500 detects candidate regions using the MCT values extracted by scanning the converted image, and detects a human region from the detected candidate regions.

The process of detecting a human region will be described in more detail. The data processing block 500 scans the entire regions while moving a search window for detecting a candidate region for the converted image transferred from the image conversion block 400 on a basis of a pixel in up, down, left and right directions, and transfers MCT values of 400 pixels corresponding to 20*20 regions where the search window is located by the scanning of the entire regions.

Further, the data processing block 500 compares a cumulative MCT value of the 400 MCT values with a preset threshold, and then, if the cumulative MCT value is relatively lower than the preset threshold, detects the corresponding region as a candidate region. Further, the data processing block 500 repetitively performs a process of calculating the position of a region detected as a candidate region in an input image of 320*240 size, for example, and figuring out the position and size of the candidate region, performs comparative calculation between the previous candidate image and the current candidate image, and, if a specific position and its peripheral regions are identified as a candidate region more than a preset number of times by comparative calculation, identifies the corresponding candidate region as a human region and outputs it.

Next, in step 1216, the image output block 600 stores the coordinates and size of the human region from the data processing block 500, applies the coordinates and size of the corresponding human region to the original input image (i.e., the first input image) from the memory control block 200 to perform the marking of a human region in a box shape, for example, thereby indicating the image of the human region.

Accordingly, it is possible to effectively detect a human region from an input image by removing noise of the input image, scaling the stored input image, converting the scaled input image by the MCT method, detecting candidate regions from the converted image using MCT values, identifying a human region from the detected candidate regions, and marking the identified human region on the input image.

Next, a process of removing noise of the input image by divided region in the aforementioned process of detecting a human region from an input image will be described.

Figure 13:
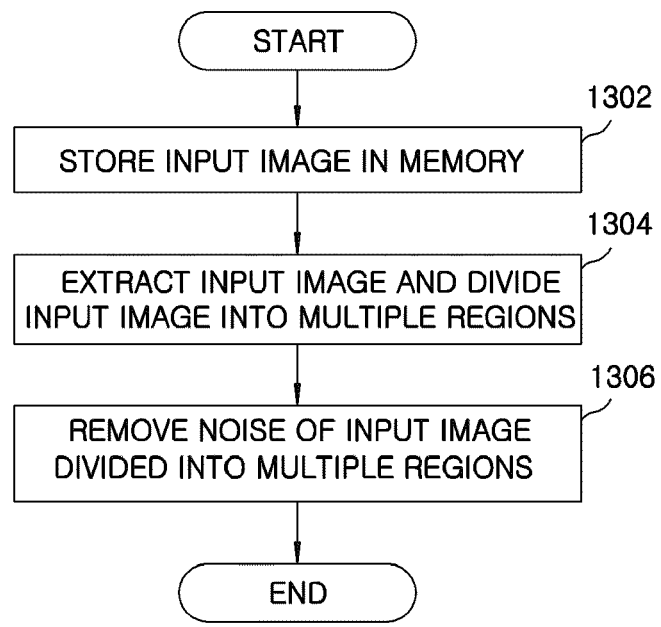
FIG. 13 provides a flowchart showing a process of removing noise of an input image in accordance with an embodiment of the present invention.

FIG. 13 is a flowchart showing a process of removing noise of an input image in accordance with an embodiment of the present invention.

Referring to FIG. 13, when an image picked up by a camera is input, the first image data storage unit 102 of the noise filtering block 100 stores the input image in the internal memory in step 1302. The stored input image is extracted and transferred to the first image analysis and division unit 104.

Then, in step 1304, the first image analysis and division unit 104 divides the input image from the noise filtering block 100 into multiple (e.g., 9 (or 3*3)) regions them.

Next, the image noise processing unit 106 removes noise from the input image having the divided regions in step 1306. The noise-removed input image is then provided to the memory control block 200. In the case of detecting an image object later, a low erroneous detection rate (i.e., high detection rate) can be ensured. Therefore, it is possible to effectively output the noise-removed input image by extracting the input image and dividing it into multiple regions, and removing image noise by divided region.

Next, a process of scaling the input image in the aforementioned process of detecting a human region from an input image will be described.

Figure 14:
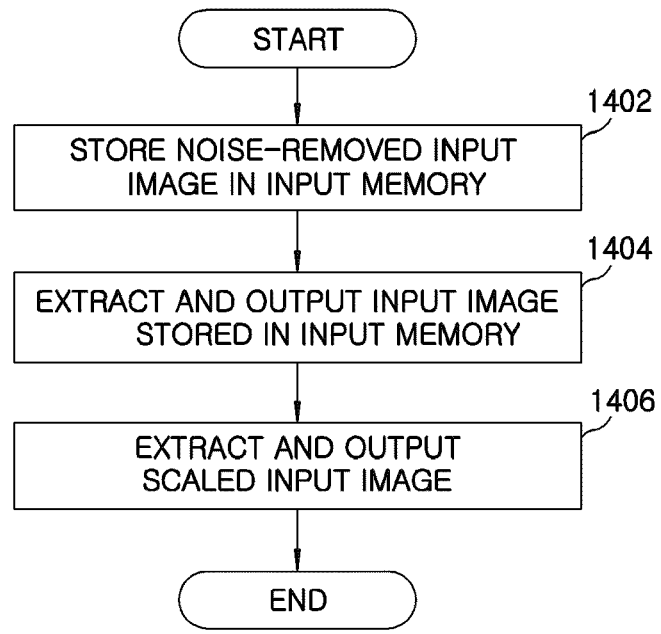
FIG. 14 illustrates a flowchart showing a process of storing an input image in a memory and outputting a scaled input image in accordance with an embodiment of the present invention.

FIG. 14 is a flowchart showing a process of producing a scaled input image in accordance with an embodiment of the present invention.

Referring to FIG. 14, in step 1402, the memory recording unit 202 of the memory adjusting block 200 stores a noise-removed input image transferred from the noise removal block 100 in the input memory unit 204. Here, the input memory unit 204 may include, for example, two input memories, and an input image to be stored and recorded by the memory recording unit 202 is alternately and consecutively stored in, for example, two input memories.

Next, in step 1404, the memory reading unit 206 extracts the input image (i.e., the original input image) stored in the input memory unit 204, and outputs the original input image as the first input image to the multiplexing unit 210.

Meanwhile, the input image stored in the input memory unit 204 is respectively extracted and transferred to the image scaling block 300 so as to be scaled. The scaled image storage unit 208 stores the scaled input image (i.e., the second input image) from the image scaling block 300 in the internal memory, and then extracts the input image for transferring it to the multiplexing unit 210. Then, the multiplexing unit 210 initially outputs the original input image (e.g., 320*240 size) once ('1' of FIG. 3), sequentially scales down the input image, and receives the sequentially scaled-down images in order instead of the initially output input image ('0' of FIG. 3) until the input image has a minimum size for image processing, thereby selectively multiplexing the original input image (i.e., the first input image) and the scaled input image (i.e., the second input image) and providing the same to the image scaling block 300, the image conversion block 400, and the image output block 600, respectively, in step 1406.

Figure 15A:
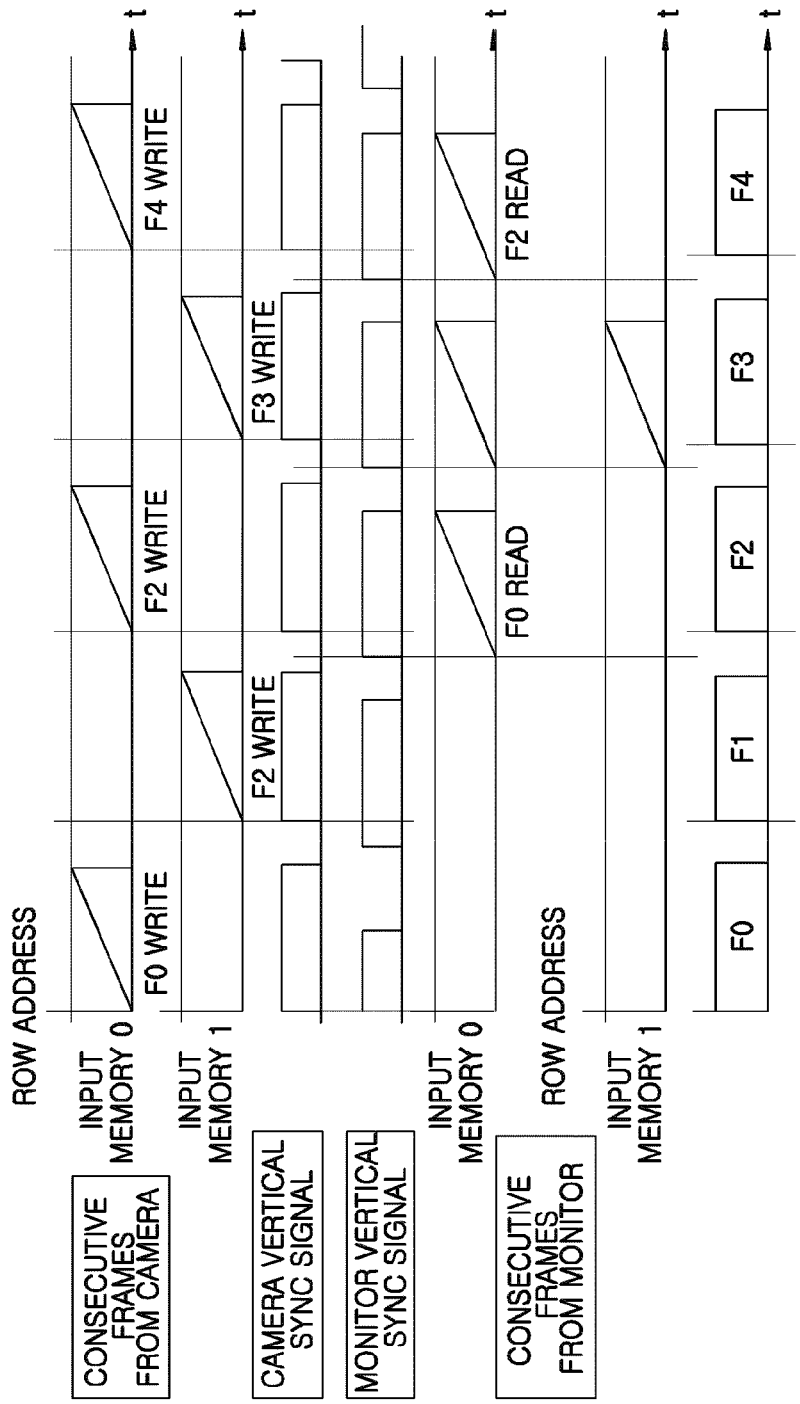
FIGS. 15A to 15C are views illustrating the input/output timings and input images of input memories and a scaled image storage unit shown in FIG. 3.
Figure 15B:
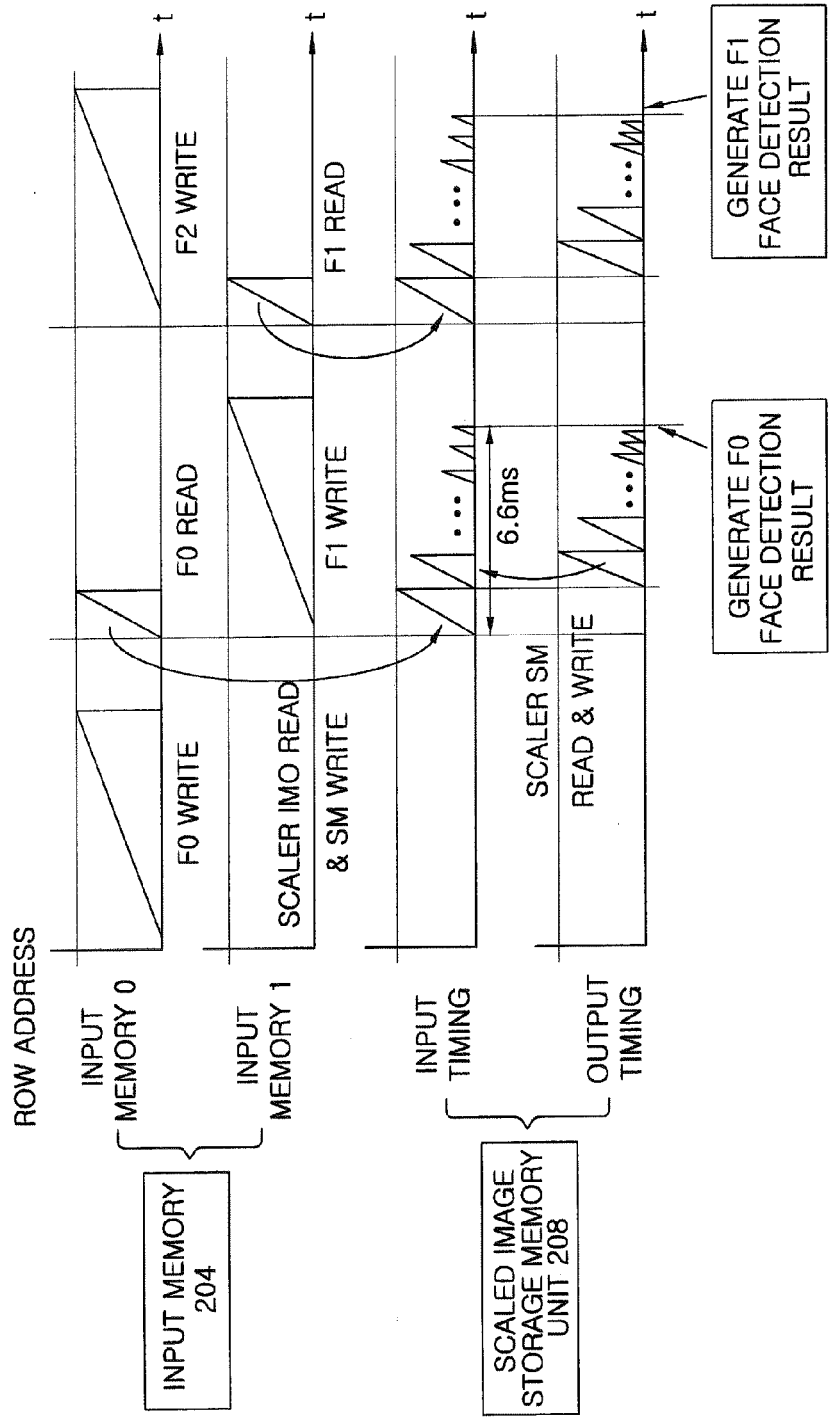
Figure 15C:

In one example, FIGS. 15A to 15C are views illustrating the input/output timings and input images of the input memories 204 and the scaled image storage unit 208 shown in FIG. 3. As shown in FIG. 15A, the memory control block 200 can effectively record and manage consecutively input high-speed images and extract the images and transfer them to other component blocks, thereby properly performing a human detection operation. The high-speed input images are alternately and consecutively input into the two input memories for storing the original image, thereby performing a human detection operation regardless of delay time caused by the processing of the input image.

Further, as shown in FIG. 15B, the scaled input images transferred from the image scaling block 300 can be recorded and read out at high speed, thereby facilitating real-time processing, and the image as shown in FIG. 15C can be stored in the input memories 204.

Therefore, the memory control block 200 can effectively output the original input image and the scaled input image, respectively, by consecutively storing a transferred input image in two input memories, respectively, outputting the respective input images to the image output block 600, scaling the respective input images, receiving them, and outputting them to the image conversion block 400.

Next, a process of horizontally and vertically scaling an input image, in the aforementioned process of detecting a human region from an input image will be described.

Figures 16A, 16B:
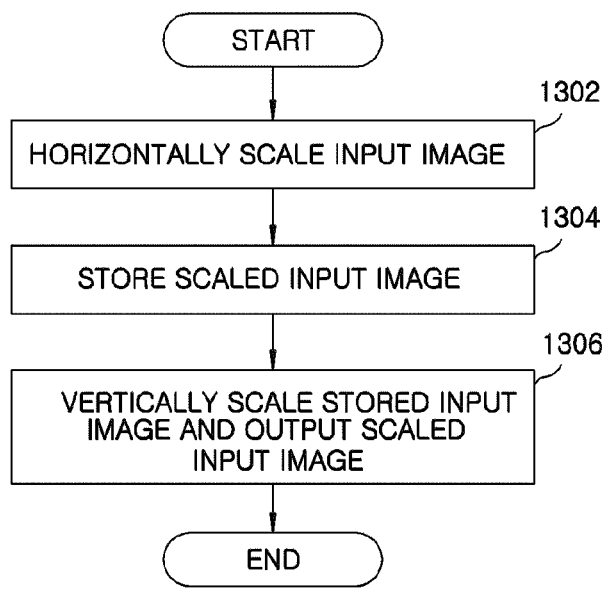
FIG. 16A illustrates a flowchart showing a process of scaling an input image and outputting the input image in accordance with an embodiment of the present invention.
FIG. 16B is a table illustrating image scaling information in accordance with an embodiment of the present invention.

FIG. 16A is a flowchart showing a process of scaling an input image in accordance with an embodiment of the present invention.

Referring to FIG. 16A, in step 1602, the horizontal scaling unit 302 of the image scaling block 300 horizontally scales the input image transferred from the memory control block 200 line by line.

Then, in step 1604, the horizontal scaling unit 302 stores the horizontally scaled input image in the line information storage unit 404.

Next, in step 1606, the vertical scaling unit 306 extracts the horizontally scaled input image from the line information storage unit 404, vertically scales the corresponding input image line by line to produce the scaled input image (i.e., the second input image).

In one example, FIG. 16B is a view illustrating image scaling information in accordance with an embodiment of the present invention. The image scaling information indicates the scale-down ratio of an image, the time required for the operation, and the cumulative time required.

Therefore, the image scaling block 300 can effectively output a scaled input image by scaling the input image along a horizontal line and scaling the image along a vertical line.

Next, a process of converting the divided image by an MCT method in the aforementioned process of detecting a human region from an input image will be described.

Figure 17:
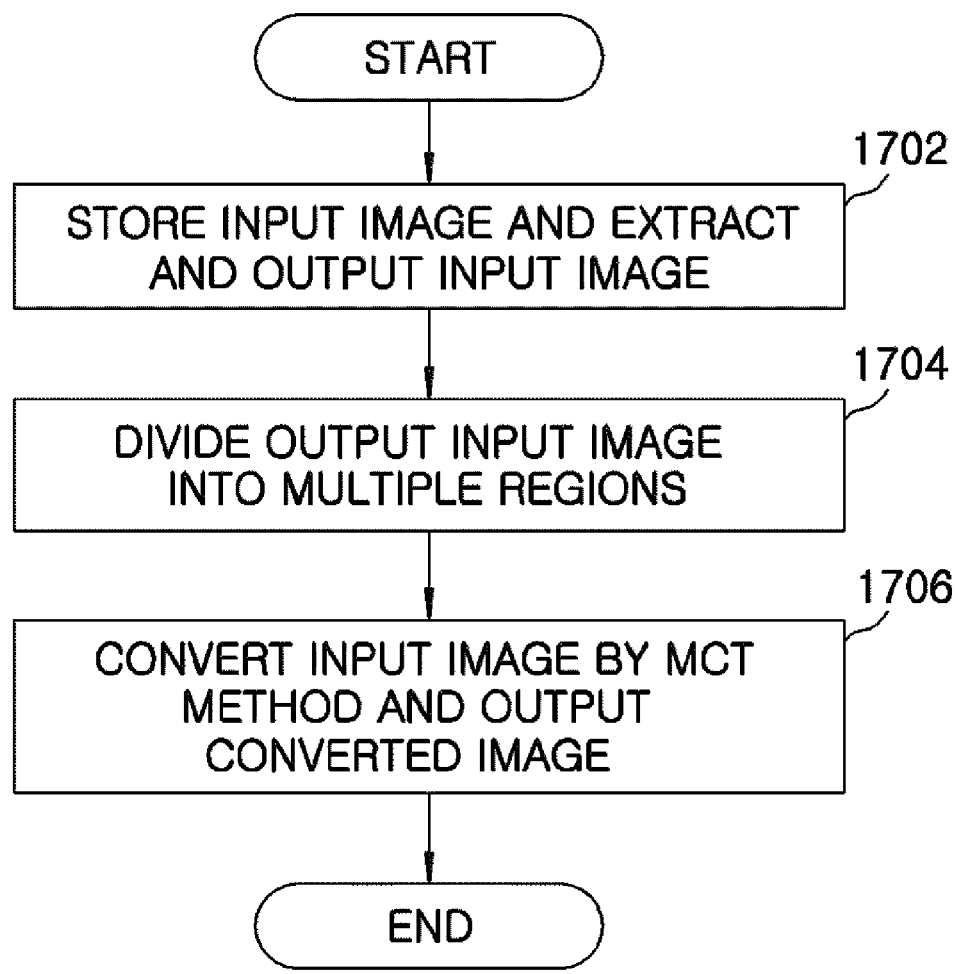
FIG. 17 is a flowchart showing a process of converting an input image by region and outputting the converted image in accordance with a fifth embodiment of the present invention.

FIG. 17 is a flowchart showing a process of converting an input image by region to produce the converted image in accordance with an embodiment of the present invention.

Referring to FIG. 17, in step 1702, the second image data storage unit 402 of the image conversion block 400 stores a first input image transferred from the memory control block 200 in the internal memory, extracts the stored first input image for transferring it to the second image analysis and division unit 404.

Then, in step 1704, the second image analysis and division unit 404 divides the extracted first input image into multiple (e.g., 9 (or 3*3)) regions.

Next, in step 1706, the MCT conversion unit 406 converts the image by the MCT method for representing relations between each of the regions divided from the first input image by the second image analysis and division unit 404 and peripheral regions as numerical values to produce the converted image.

Figure 18A:
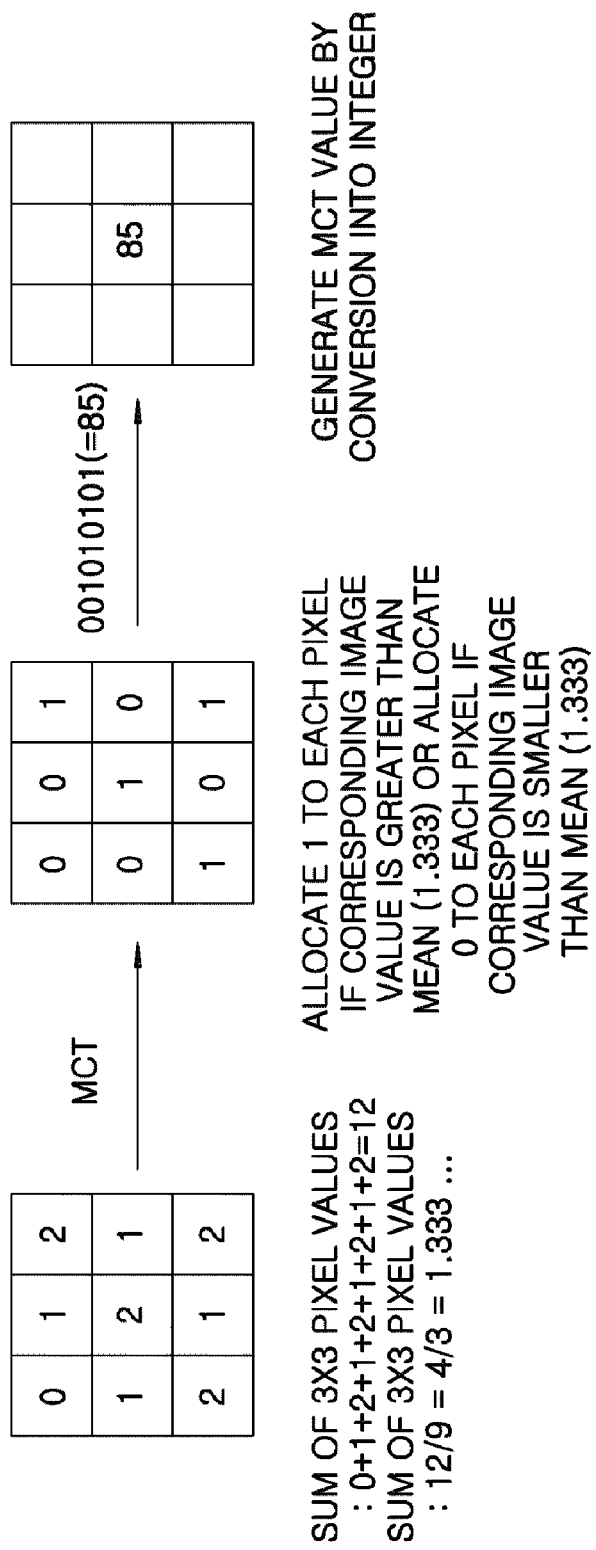
FIGS. 18A and 18B are views illustrating an MCT-based image conversion and a converted image produced thereby in accordance with an embodiment of the present invention.
Figure 18B:

In one example, FIGS. 18A and 18B are views illustrating an MCT-based image conversion and a converted image made by such conversion in accordance with an embodiment of the present invention. As shown in FIG. 18A, image values of 9 (or 3*3) pixels are added to calculate the sum of 12; and mean of 1.333 thereof, and a value "1" is allocated to each pixel if the corresponding image value is greater than the mean, or a value "0" is allocated to each pixel if the corresponding image value is smaller than the mean, the image value is converted into an integer to obtain an MCT conversion value of 85, and a converted image based on this MCT conversion is represented as shown in FIG. 18B.

Therefore, the image conversion block 400 can effectively output an image robust against changes in lighting by storing the input image, extracting the input image, dividing it into multiple regions, converting the input image divided into multiple regions by the MCT method, thereby obtaining the converted image.

Next, a process of detecting candidate regions in the aforementioned process of detecting a human region from an input image will be described.

Figure 19:
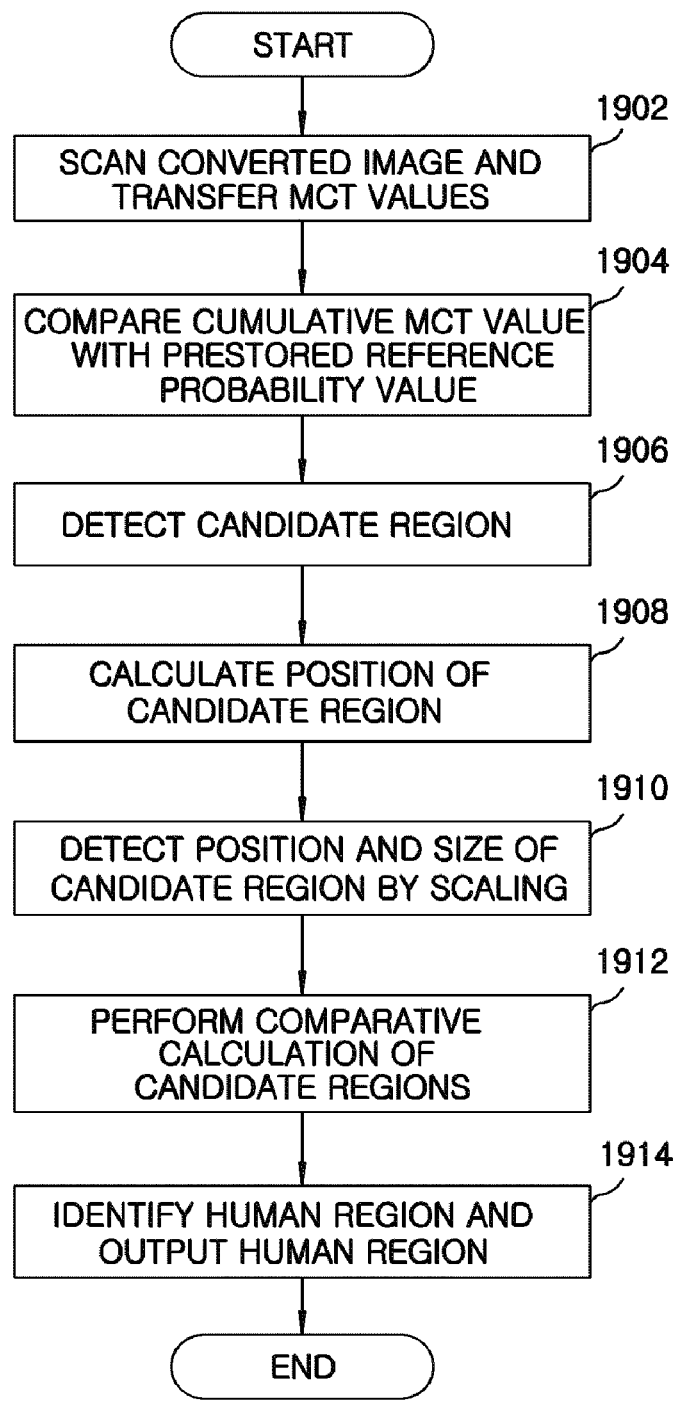
FIG. 19 illustrates a flowchart showing a process of detecting a human region using MCT values of a converted image in accordance with an embodiment of the present invention.

FIG. 19 is a flowchart showing a process of detecting a human region using MCT values of a converted image in accordance with an embodiment of the present invention.

Referring to FIG. 19, in step 1902, the image analysis unit 502 of the data processing block 500 scans the entire regions while moving a search window for detecting a candidate region for the converted image transferred from the image conversion block 400 in units of one pixel in up, down, left and right directions, and transfers MCT values of 400 pixels corresponding to 20*20 regions where the search window is located by the scanning of the entire regions.

Then, in step 1904, the image detection unit 504 compares a cumulative MCT value of the 400 MCT values with a preset threshold. Here, the preset threshold is a value which is learned and stored offline in advance, and refers to a value that is set for identifying a candidate region as a human region when an MCT value is relatively lower than a specific probability value.

Based on a result of comparison, if the cumulative MCT value is relatively lower than the preset threshold, the image detection unit 504 detects the corresponding region as a candidate region in step 1906. Also, multiple candidate regions may be detected based on the result of comparison between the cumulative MCT value and the preset threshold.

For instance, the image detection unit 504 extracts probability values stored in the human confidence memory unit 504a including 400 human confidence memories, respectively, adds them in the human confidence calculation unit 504b, compares the sum of the probability values with a preset threshold value, identifies a human candidate region if the sum of the probability values is relatively smaller than the preset threshold value, and transfers a valid signal resulting from the identification to the coordinate information generation unit 504c. In response to the valid signal, the coordinate information generation unit 504c generates position information (i.e., x and y coordinates of the left top corner) of the search window and a scale information signal of the scaled image scaled by the image scaling block 300 based on horizontal and vertical sync information transferred from the memory control block 200, and output them as candidate region information.

FIGS. 20A and 20B are views illustrating confidence values depending on MCT values and the conversion thereof in accordance with an embodiment of the present invention. As shown in FIG. 20A, an intrinsic confidence value is determined depending on the positions in the 20*20 window and the MCT values. As shown in FIG. 20B, this confidence value can be converted into Q8.8 fixed point format and stored in the memory in the form of a look-up table (LUT).

Next, in step 1908, the position resetting unit 506 calculates the position of a region detected as a candidate region in an input image of, e.g., 320*240 size.

In addition, in step 1910, the position resetting unit 506 figures out the position and size of the detected candidate region in the scaled input image. That is, the position resetting unit 506 is adapted to calculate the position and size of a region detected as a candidate region in the input image of 320*240 size, but in order to detect a human region from the input image of the original size and the scaled input image as well, the position resetting unit 506 can reset the position in a final output image by calculating the position and size corresponding to the original image if a candidate region is detected from a scaled-down image.

For instance, the coordinate information signal distribution unit 506a transfers coordinate information of a candidate region from the image detection unit 504, along with a control signal, to the corresponding position conversion memory unit 506b based on image scaling information in order to calculate the corresponding position of the image having the original size, and thus converted position coordinates can be transferred to the position information signal generation unit 506c. Accordingly, the position information signal generation unit 506c generates the x and y coordinates of the left top corner of the search window and window size information by using the converted position coordinates and the image scaling information. These processes can be repeatedly performed on multiple candidate regions.

Figure 21:
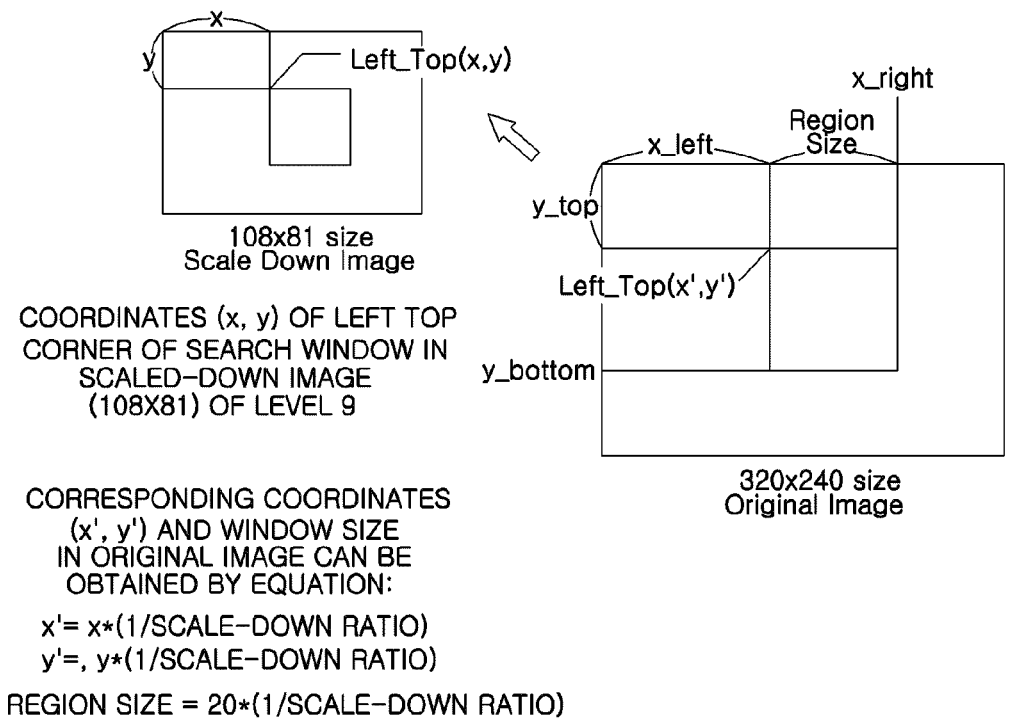
FIG. 21 is a view illustrating the calculation of a corresponding position in the original image in accordance with an embodiment of the present invention.

FIG. 21 is a view illustrating the calculation of a corresponding position in the original image in accordance with an embodiment of the present invention. For the coordinates of the left top corner in the original image, corresponding coordinates are calculated depending on the scale-down ratio, and the size of the detection region window can be also calculated as the size of detection window (20)*(1/scale-down ratio). Thus, in order to prevent erroneous calculations that are repetitively performed, the corresponding coordinates are calculated in advance and stored in 14 corresponding position conversion LUT memories, respectively, by scale level, and the coordinates can be assigned to the corresponding addresses.

Subsequently, in step 1912, the image grouping unit 508 performs comparative calculation between the previous candidate image and the current candidate image that are transferred based on a result of repetitively performing the process of figuring out the position and size of a candidate region.

Based on such comparative calculation, if a specific position and its peripheral regions are identified as a candidate region more than a preset number of times (e.g., three times), the image grouping unit 508 identifies the corresponding candidate region as a human region and outputs it in step 1914.

That is, if a specific position and its peripheral regions are identified as a candidate region, for example, more than three times, the image grouping unit 508 identifies the corresponding region as an actual human region, and thus prevents the occurrence of an error of recognizing a non-human region as a human region, thereby ensuring robustness against human detection even with various background changes to indoor and outdoor environments.

For instance, the candidate region signal distribution unit 508a of the image grouping unit 508 distributes and transmits x and y coordinates of the left top corner of a detected region and window size information signal to 32 different data group comparators 508b, and the data group comparators 508b configured to simultaneously detect 32 different people compare respective detected candidate region information and return the information to the data control unit 508c, so that the data control unit 508c controllably transmits it to the 0 to 31-th data group comparators 508b for comparison and grouping.

Also, the data control unit 508c analyzes the horizontal and vertical sync information transferred from the memory control block 200, and generates the valid signal for validating output data of the data group comparison unit 508b upon completion of the comparison of detected candidate regions in one frame and transfers it to the final detected region signal generation unit 508d. Then, the final detected region signal generation unit 508d can output 32 final detected region information transferred from the data group comparison unit 508b in response to the transferred enable signal.

Figure 22A:
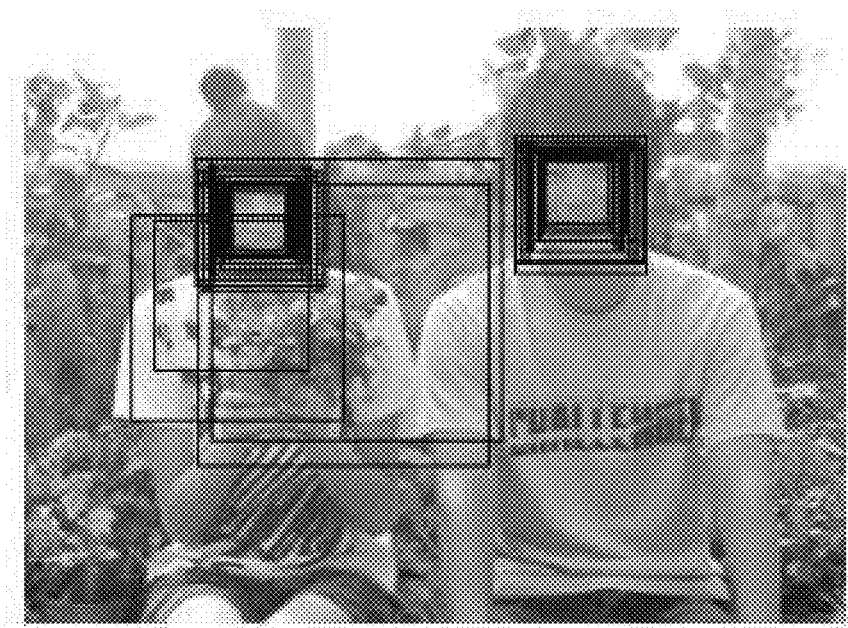
FIGS. 22A and 22B are views for explaining data grouping in accordance with an embodiment of the present invention.
Figure 22B:
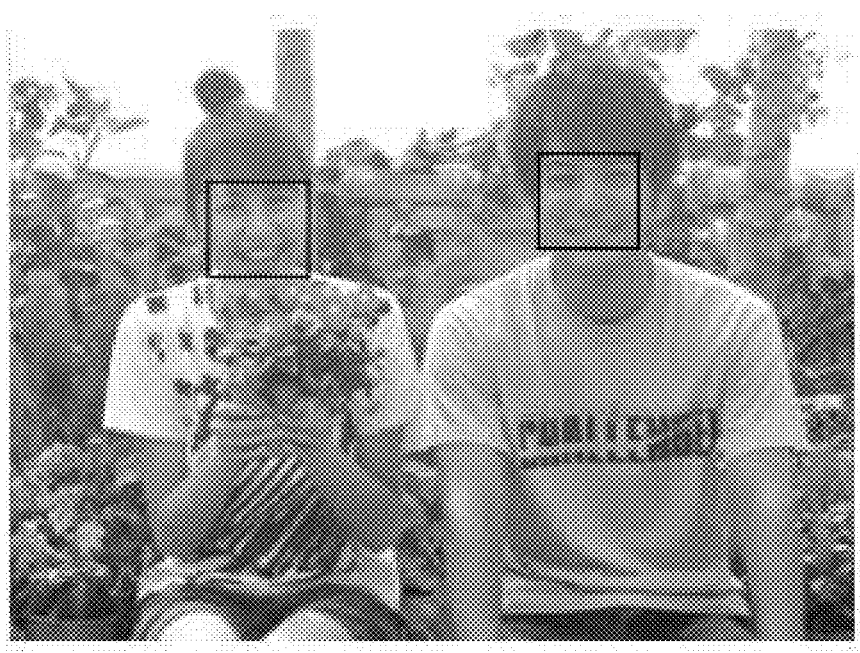

FIGS. 22A and 22B are views for explaining data grouping in accordance with an embodiment of the present invention. It can be seen that detected candidate regions appear repeatedly, for example, three times or more near a position where a human exists but once or twice or less in erroneous detected regions. In case data grouping is applied to a detected candidate image as shown in FIG. 22A, human regions can be identified as shown in FIG. 22B.

Therefore, the data processing block 500 can detect candidate regions depending on MCT values by scanning a converted image and transferring MCT values, detecting candidate regions using the transferred MCT values, and identifying a human region from the detected human regions, and can effectively identify a human region by comparative calculation between the detected candidate regions.

Next, a process of marking an identified human region on an input image according to the coordinates and size of the human region in the aforementioned process of detecting a human region from an input image will be described.

Figure 23:
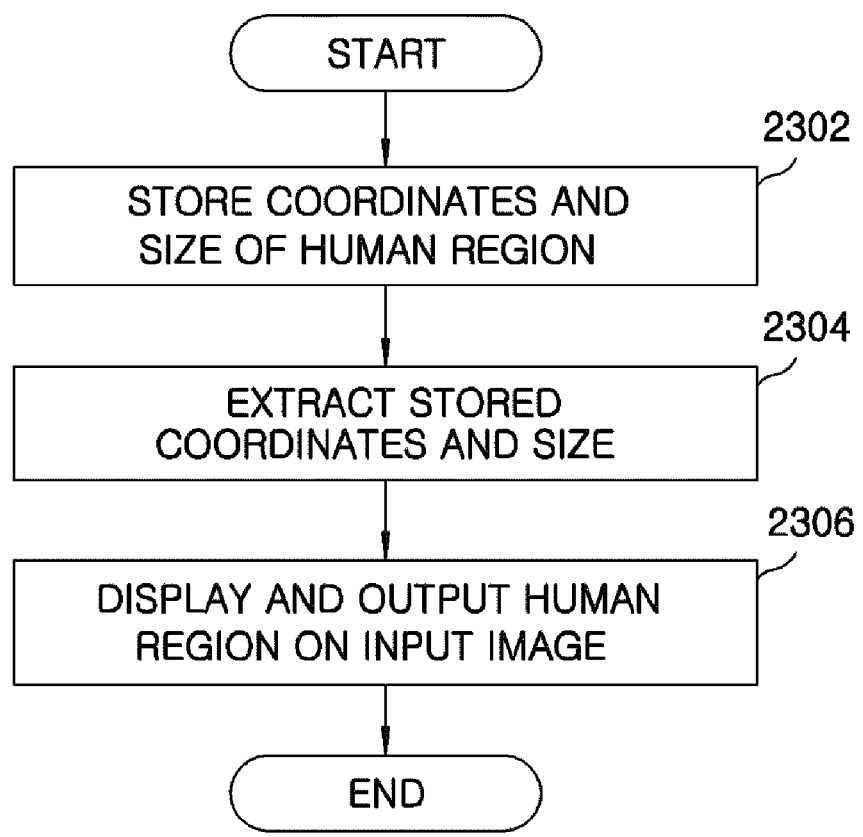
FIG. 23 illustrates a flowchart showing a process of marking a human region on an input image in accordance with an embodiment of the present invention.

FIG. 23 is a flowchart showing a process of marking a human region on an input image in accordance with an embodiment of the present invention.

Referring to FIG. 23, in step 2302, the output image processing unit 602 of the image output block 600 divides and stores human region information (e.g., coordinates, sizes, etc. of human regions) on human regions provided from the data processing block 500 in the detected image storage unit 604.

Then, in step 2304, a human detected region displayed in a box is transferred to the image display unit 606 based on the human region information (e.g., coordinates, sizes, etc. of human regions) on human regions stored in the detected image storage unit 604. Here, the human region information may be stored in the corresponding respective internal memories (e.g., 32 internal memories) if there are multiple detected human regions and the respective human region information can be output from these internal memories.

Figure 24:
FIG. 24 is a view illustrating an image indicating human regions in accordance with an embodiment of the present invention.

Next, in step 2306, the image display unit 606 combines the original input image (i.e., first input image) transferred from the memory control block 200 with a detected human region displayed in the box, for example, to perform the marking of an image indicative of the human region. In one example, FIG. 24 is a view illustrating an image indicating the human regions in accordance with an embodiment of the present invention, wherein it can be seen that an image indicating multiple human regions is output.

Therefore, the image output block 600 applies the coordinates and size of a detected human region to the original input image to display the human region, thereby making it easy to recognize the detected human region in the input image.

As described above, the present invention can increase the accuracy of human recognition, detect an image object at high speed, and provide human detection performance with high success rate compared to the existing method by providing robustness against external limiting factors, such as camera noise, changes in lighting, etc., as well as the characteristics not related to changes in the position of a human and changes in size, in the recognition of humans of various shapes.

While the present invention has been shown and described with respect to the preferred embodiments, it will be understood by those skilled in the art that various changes and modifications may be made without departing from the scope of the invention as defined in the following claims.

What is claimed is:

1. An apparatus of detection an image object comprising:
   a noise filtering block for dividing an input image into multiple regions and removing image noise in the input image to produce a noise-removed image;
   an image scaling block for scaling the noise-removed input image to produce a scaled input image;
   a memory control block for temporarily storing the noise-removed input image, and the scaled input image, wherein the noise-removed image and the scaled image being transferred as a first input image and a second input image, respectively;
   an image conversion block for dividing the second input image into multiple regions and converting the divided image by a modified census transform (MCT) method;
   a data processing block for comparing MCT values of the image converted by the MCT method with a preset threshold value, detecting at least one candidate region, and identifying a human region from said at least one detected candidate region; and
   an image output block for marking the identified human region on the first input image.

2. The apparatus of claim 1, wherein the noise filtering block includes:
   an image data storage unit for temporarily storing the input image;
   an image analysis and division unit for dividing the stored input image into the multiple regions; and
   an image noise processing unit for removing noise of the divided input image by region to produce the noise-removed input image.

3. The apparatus of claim 1, wherein the memory control block includes:
   a memory recording unit for temporarily storing the first input image from the noise filtering block;
   a memory reading unit for extracting the first input image;
   a scaled image storage unit for temporarily storing the second input image; and
   a multiplexing unit for multiplexing the first input image from the memory reading unit and the second input image from the scaled image storage unit to selectively output a multiplexed image to the image scaling block, the image conversion block and the image output block, respectively.

4. The apparatus of claim 1, wherein the image scaling block includes:

a horizontal scaling unit for horizontally scaling the noise-removed input image from the memory control block line by line to produce a horizontally scaled input image; and a vertical scaling unit for vertically scaling the horizontally scaled input image line by line to produce a vertically scaled input image as the second input image.

5. The apparatus of claim 1, wherein the image conversion block includes:

an image data storage unit for temporarily storing the second input image output from the memory control block;

an image analysis and division unit for dividing the extracted second input image into multiple regions to produce a divided image; and an MCT conversion unit for converting the second input image that is divided into multiple regions and output by the MCT method to produce the converted image.

6. The apparatus of claim 5, wherein the MCT conversion unit represents relations between each of the divided regions and its peripheral regions as numeral values by the conversion of the MCT method.

7. The apparatus of claim 1, wherein the data processing block includes:

an image analysis unit for scanning the entire regions of the input image while moving a search window for detecting a candidate region for the converted image on a pixel basis in up, down, left, and right directions, and transferring MCT values of pixels corresponding to regions where the search window is located;

an image detection unit for comparing a cumulative MCT value of the MCT values with a preset threshold, and, if the cumulate MCT value is relatively lower than the preset threshold, thereby detecting the candidate region;

a position resetting unit for repetitively calculating a position of a region detected as the candidate region; and an image grouping unit for performing comparative calculation between a previous candidate image and a current candidate image during the repetitive operation of the detection of the candidate image and the position calculation, and, if it is identified as the candidate region by a preset number of times, identifying the candidate region as the human region.

8. The apparatus of claim 7, wherein the preset threshold value refers to a value that is set for identifying the candidate region as the human region when an MCT value is relatively lower than a specific probability value.

9. The apparatus of claim 1, wherein the image output block includes:

an output image processing unit for storing human region information including coordinates and size of the human region from the data processing block;

a detected image storage unit for extracting the human region information; and an image display unit for marking the human region by applying the coordinates and size of the human region to the first input image.

10. The apparatus of claim 9, wherein, if there are multiple human regions detected, the detected image storage unit includes memories corresponding to the number of the human regions for storing the coordinates and sizes of the human regions.

11. A method of detecting an image object comprising:
dividing an input image into multiple regions;
removing image noise in each divided input image;
storing the noise-removed input image;
scaling the noise-removed input image to produce a scaled input image, wherein the noise-removed input image and the scaled input image being transferred as a first input image and a second input image, respectively;

converting the second image by a modified census transform (MCT) method;

comparing MCT values of the image converted by the MCT method with a preset threshold to detect at least one candidate region;

identifying a human region from said at least one detected candidate region; and marking the identified human region on the first input image.

12. The method of claim 11, wherein said removing image noise in each divided input image includes:
temporarily storing the input image;
dividing the input image into multiple regions; and
removing noise of the divided input image by region.

13. The method of claim 11, wherein said scaling the noise-removed input image includes:
horizontally scaling the noise-removed input image line by line to produce a horizontally scaled input image; and
vertically scaling the horizontally scaled input image line by line to produce a vertically scaled input image as the second input image.

14. The method of claim 11, wherein said converting the second image includes:
dividing the second input image into multiple regions; and
converting the second input image having the multiple divided regions by the MCT method, thereby producing the converted image.

15. The method of claim 14, wherein the converted image is output by representing relations between each of the divided regions and its peripheral regions as numeral values by the conversion of the MCT method.

16. The method of claim 11, wherein said detecting at least one candidate region includes:
scanning the entire regions while moving a search window for detecting a candidate region for the converted image on a pixel basis in up, down, left, and right directions;
obtaining MCT values of pixels corresponding to regions where the search window is located; and
comparing a cumulative MCT value of the MCT values with a preset threshold, and, if the cumulate MCT value is relatively lower than the preset threshold, detecting the candidate region.

17. The method of claim 16, wherein the preset threshold refers to a value that is set for identifying the candidate region as the human region when an MCT value is relatively lower than a specific probability value.

18. The method of claim 11, wherein said identifying the human region includes:
repetitively calculating a position of a region detected as the candidate region; and
performing comparative operation between a previous candidate image and a current candidate image during the repetitive operation of the detection of the candidate image and the position calculation, and, if it is identified as the candidate region by a preset number of times, identifying the candidate region as the human region.

19. The method of claim 11, wherein said marking the identified human region includes:
temporarily storing human region information including coordinates and size of the human region from the data processing block; and
marking the human region by applying the coordinates and size of the human region to the first input image.

20. The method of claim 19, wherein, if there are multiple human regions detected, the coordinates and sizes of the human regions are stored in memories corresponding to the number of the human regions.

* * * * *